US010830989B2

(12) United States Patent
Takinoiri

(10) Patent No.: US 10,830,989 B2
(45) Date of Patent: Nov. 10, 2020

(54) OBSERVATION DEVICE AND FOCUS DETECTION METHOD COMPRISING A CONTROLLER TO EXECUTE AN IMAGING OPERATION AND TO DETECT FOCUS POSITION BASED ON AN EVALUATION VALUE

(71) Applicant: Olympus Corporation, Hachioji (JP)

(72) Inventor: Satoshi Takinoiri, Yokohama (JP)

(73) Assignee: Olympus Corporation, Tokyo (JP)

( * ) Notice: Subject to any disclaimer, the term of this patent is extended or adjusted under 35 U.S.C. 154(b) by 234 days.

(21) Appl. No.: 16/208,385

(22) Filed: Dec. 3, 2018

(65) Prior Publication Data

US 2019/0179110 A1 Jun. 13, 2019

(30) Foreign Application Priority Data

Dec. 7, 2017 (JP) ................................. 2017-235380

(51) Int. Cl.
  *G02B 7/28* (2006.01)
  *H04N 5/232* (2006.01)
  *G02B 7/38* (2006.01)
  *G02B 21/24* (2006.01)

(52) U.S. Cl.
  CPC ............... *G02B 7/282* (2013.01); *G02B 7/38* (2013.01); *G02B 21/244* (2013.01); *H04N 5/232121* (2018.08); *H04N 5/232123* (2018.08); *G02B 21/241* (2013.01)

(58) Field of Classification Search
  CPC .. G03B 13/36; G03F 9/7026; H04N 5/23212; H04N 5/232121; H04N 5/232123; G02B 21/241; G02B 21/244; G02B 7/282; G02B 7/38
  USPC ............................................. 250/208.1, 214 R
  See application file for complete search history.

(56) References Cited

U.S. PATENT DOCUMENTS 7,864,308 B2 * 1/2011 Sato ....................... G03F 9/7026
356/123
2008/0225278 A1 9/2008 Namba et al.

* cited by examiner

*Primary Examiner* — Que Tan Le
(74) *Attorney, Agent, or Firm* — John C. Pokotylo; Pokotylo Patent Services

(57) ABSTRACT

An observation device, comprising an AF detection circuit that calculates an evaluation value showing a larger value as degree of focus increases, based on an image signal, and a controller that detects focus position where focus is achieved based on the evaluation value, wherein the controller, when peaks of the evaluation value have been detected for different focus positions, detects a minimum of the evaluation value between focus positions of the plurality of peaks, and in the event that a first difference between a first peak, among the plurality of peaks, and a focus position of the minimum, and a second difference between the minimum and a focus position of a second peak, among the plurality of peaks, are within respective specified ranges, detects a focus position where focus is achieved based on the focus position of the minimum.

20 Claims, 12 Drawing Sheets

OBSERVATION DEVICE AND FOCUS DETECTION METHOD COMPRISING A CONTROLLER TO EXECUTE AN IMAGING OPERATION AND TO DETECT FOCUS POSITION BASED ON AN EVALUATION VALUE

CROSS-REFERENCE TO RELATED APPLICATIONS

Benefit is claimed, under 35 U.S.C. § 119, to the filing date of prior Japanese Patent Application No. 2017-235380 filed on Dec. 7, 2017. This application is expressly incorporated herein by reference. The scope of the present invention is not limited to any requirements of the specific embodiments described in the application.

BACKGROUND OF THE INVENTION

1. Field of the Invention

The present invention relates to an observation device and focus adjustment method that perform imaging of a specimen such as cells using an imaging section, and perform focus adjustment of a focus lens on the basis of image data that has been acquired.

2. Description of the Related Art

Conventionally, in an observation device, such as a microscope, a device that performs an auto focus operation by determining contrast by means of image processing of an observation image that has been formed by an image sensor, a so-called contrast AF method auto focus device, is known. With this contrast AF a contrast value (focus evaluation value) for a subject image that has been formed by a photographing lens is calculated, and focus position of a focus lens is controlled such that this focus evaluation value becomes a peak (refer to Japanese patent laid-open No. 5289768 (hereafter referred to as patent publication 1)).

Also, in recent years, in the fields of biochemistry and medicine there has been cultivation and breeding of cells that have been collected from within the body, and there has been advancement in research applied to the examination of such cells that have been cultivated. As a result of this there has been advancement in the automation of observation and measurement of cultivated cell states, and the automation of focus adjustment on cells has also been investigated. However, for transparent objects such as non-colored cells, with contrast AF a focus evaluation value does not become a peak at an in focus position, but becomes a local minimum value between two contrast peaks (called a double peak).

With patent publication 1 described above, in order to handle this phenomenon a method has been proposed to detect two contrast peaks, and select a position between these two contrast peaks as a focus position. Also, as other methods, there has been proposed a method wherein, after detection of one contrast peak a focus lens is driven to the close-up end and the infinity end while making drive amount small, a position where there is no longer any change in contrast at the close-up end and the infinity end is made a contrast local minimum, and position where this local minimum is achieved is selected as a position where focus is achieved, or a method where a focus lens is driven in one direction from a contrast peak position, and a position where focus is achieved is selected by detecting contrast local minimum based on a contrast value relationship.

With patent publication 1 described above, detection relies on the assumption that there is contrast local minimum position at an intermediate position between two peaks. However, depending on the observation environment, the local minimum position is not limited to being at an intermediate position between two peaks. Also, with a method where the focus lens is driven to the close-up end and the infinity end and a position where there is no longer any change in contrast is detected, a lot of time is required to detect local minimum position. Further, with a method where determination is with a contrast magnitude relationship, there is the possibility of erroneous determination of local minimum position as a result of slight change in contrast.

SUMMARY OF THE INVENTION

The present invention provides an observation device and focus adjustment method that detect local minimum position of focus evaluation value with high accuracy and at high speed, regardless of observation environment, such as type of cells, culture vessel, etc., and perform focus adjustment of a focus lens.

An observation device of a first aspect of the present invention comprises an image sensor that images a specimen and outputs an image signal, an AF detection circuit that calculates an evaluation value showing a larger value as degree of focus increases, based on an image signal, and a controller that executes an imaging operation using the image sensor by changing focus position, executes calculations of the evaluation value using the AF detection circuit, and detects focus position where focus is achieved based on the evaluation value, wherein, the controller, when a plurality of peaks of the evaluation value have been detected for different focus positions, detects a minimum of the evaluation value between focus positions of the plurality of peaks, and in the event that a first difference between a first peak, among the plurality of peaks, and a focus position of the minimum, and a second difference between the minimum and a focus position of a second peak, among the plurality of peaks, are within respective specified ranges, detects a focus position where focus is achieved based on the focus position of the minimum.

A focus detection method of a second aspect of the present invention is a focus detection method for a focus detection device that executes an imaging operation by changing focus position and outputs an image signal, calculates an evaluation value showing a larger value as degree of focus increases, based on the image signal, and detects a focus position where focus is achieved based on the evaluation value, the focus detection method comprising: when peaks of the evaluation value have been detected for different focus positions, detecting a minimum of the evaluation value between focus positions of the plurality of peaks, and in the event that a first difference between a first peak, among the plurality of peaks, and a focus position of the minimum, and a second difference between the minimum and a focus position of a second peak, among the plurality of peaks, are within respective specified ranges, detecting a focus position where focus is achieved based on the focus position of the minimum.

A non-transitory computer-readable medium of a third aspect of the present invention, storing a processor executable code, which when executed by at least one processor, performs a focus detecting method, the focus detecting method comprising: executing an imaging operation by changing focus position and outputting an image signal, calculating an evaluation value showing a larger value as degree of focus increases, based on the image signal, and detecting a focus position where focus is achieved based on the evaluation value, the focus detecting method further comprising: when peaks of the evaluation value have been detected for different focus positions, detecting a minimum of the evaluation value between focus positions of the plurality of peaks, and in the event that a first difference between a first peak, among the plurality of peaks, and a focus position of the minimum, and a second difference between the minimum and a focus position of a second peak, among the plurality of peaks, are within respective specified ranges, detecting a focus position where focus is achieved based on the focus position of the minimum.

DETAILED DESCRIPTION OF THE PREFERRED EMBODIMENTS

An example where the present invention has been applied to a cell observation device, as one embodiment of the present invention, will be described in the following using the drawings. With this embodiment, there is an imaging section for forming images of a specimen, an image signal is acquired from the imaging section while changing focus position of the imaging section, and focus position of the imaging section is controlled by calculating a focus evaluation value (contrast value) based on this image signal (refer, for example, to S15 and S17 in FIG. 7).

Figure 8:
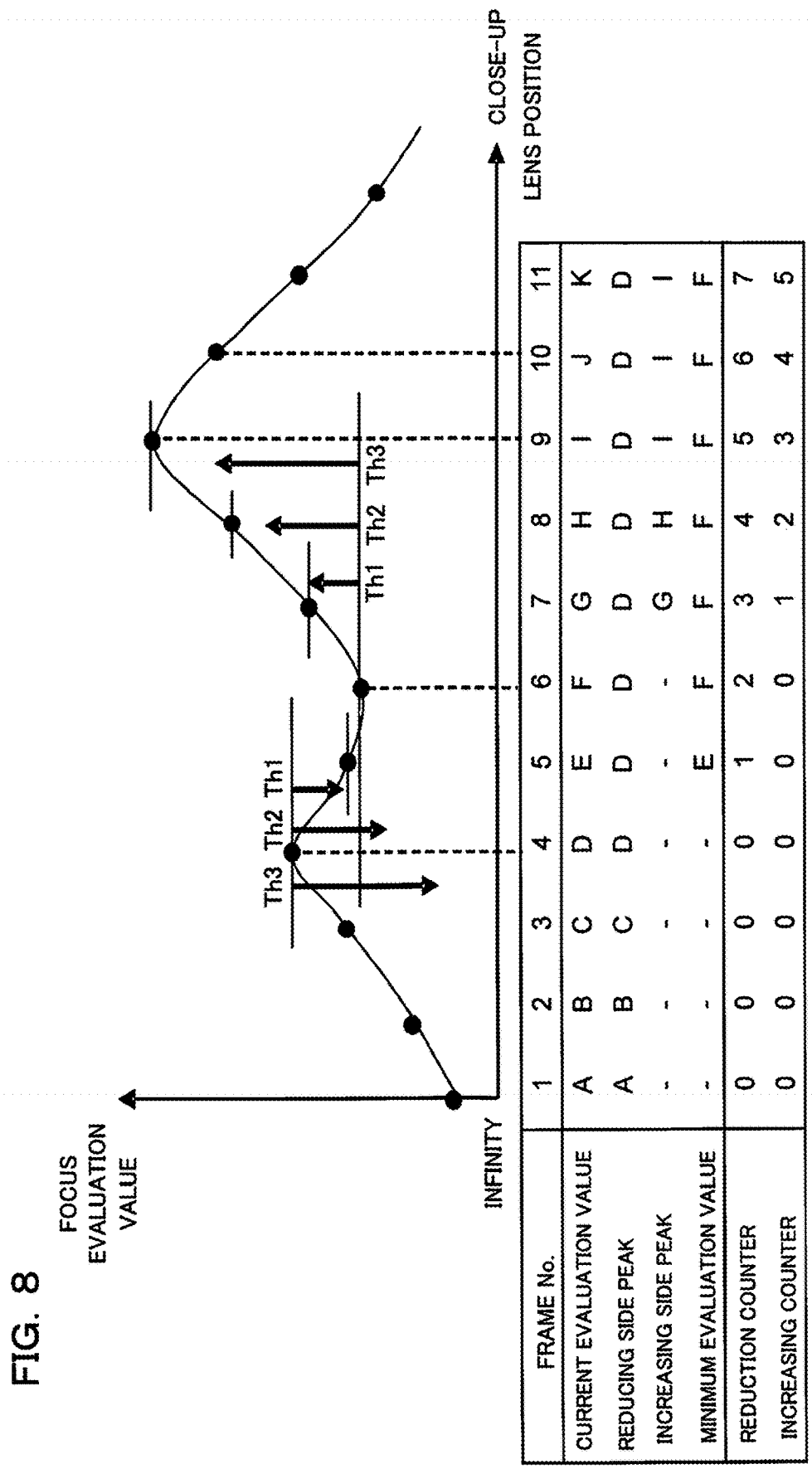
FIG. 8 is a drawing showing one example of local minimum determination processing, in the cell observation device of one embodiment of the present invention.
Figure 10:
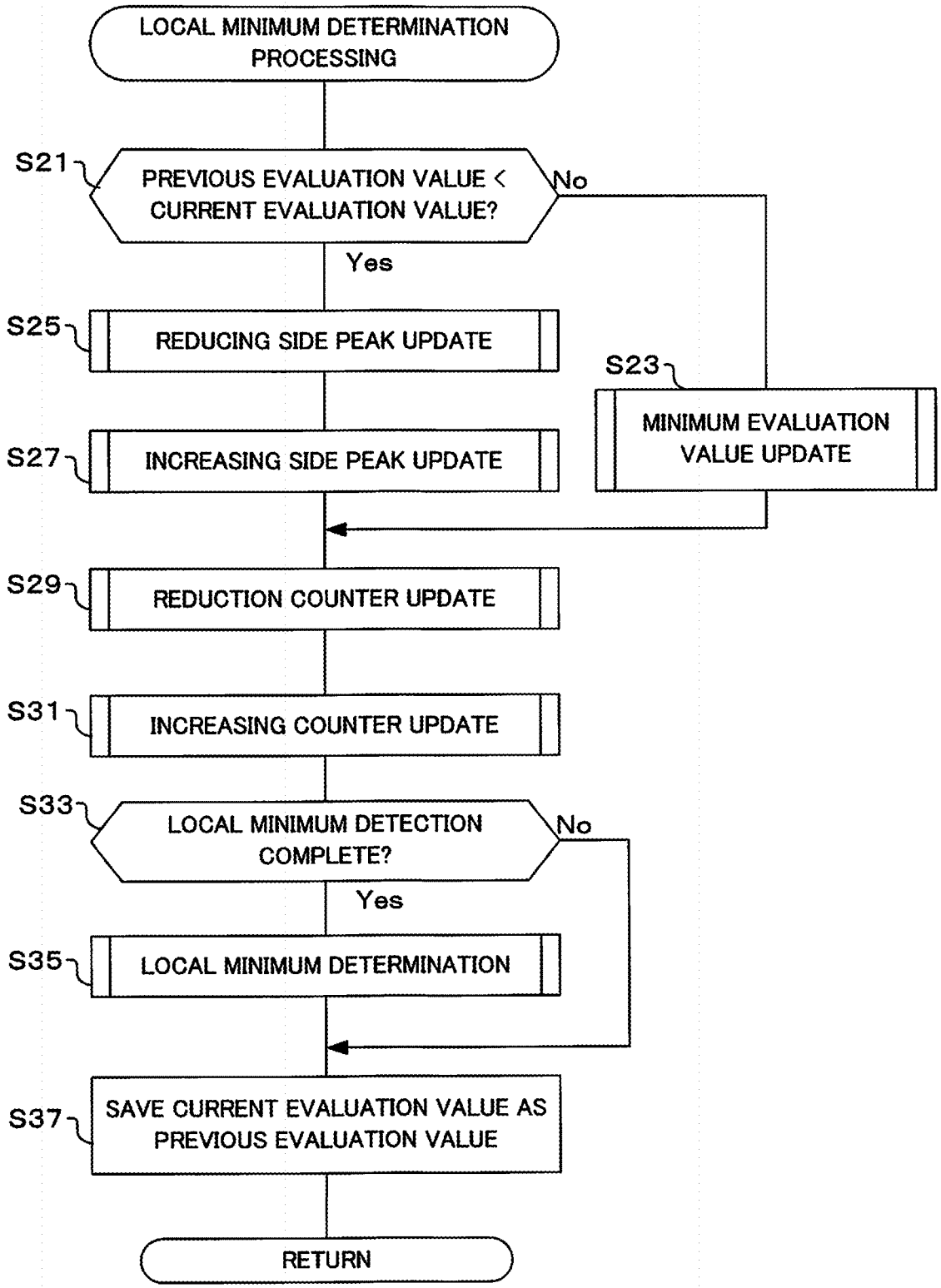
FIG. 10 is a flowchart showing operation of local minimum determination processing in the cell observation device of one embodiment of the present invention.

Also, in calculating in-focus position in this embodiment, in the event that a peak of focus evaluation value has been detected at two or more focus positions (for example, focus evaluation values corresponding to frame No. 4 and frame No. 9 in FIG. 8), a minimum of focus evaluation values between the focus positions of the plurality of peaks is detected (refer, for example, to the focus evaluation value corresponding to frame No. 6 in FIG. 8, and to S23 in FIG. 10), and it is determined whether or not there is a true in-focus position based on whether a first difference between a first peak, among the plurality of peaks, and a minimum focus position (for example, a lens position interval between Frame No. 4 and frame No. 6 in FIG. 8), and a second difference between the minimum and focus position of a second peak (for example, a lens position interval between frame No. 6 and frame No. 9 in FIG. 8), are within respective specified ranges.

Also, when calculating in-focus position in this embodiment, in a case where a peak of focus evaluation value has been detected at two or more focus positions, it is determined whether or not there is a true in-focus position based on a third difference between an evaluation value of a first peak and a minimum evaluation value (for example, a difference between a reducing side peak "D" and a minimum evaluation value "F" in FIG. 8), and fourth difference between an evaluation value of a second peak and a minimum evaluation value (for example, a difference between a minimum evaluation value "F" and an increasing side peak "I" in FIG. 8).

Also, when calculating in-focus position with this embodiment, when a first peak of focus evaluation value is detected (for example, frame no. 4 in FIG. 8), and a minimum evaluation value has been further detected (for example, frame No. 6 in FIG. 8), a range for detecting a second peak is set (refer, for example, to setting an increasing counter to 5 as a local minimum detection end position in FIG. 8, and S33 in FIG. 10).

Figure 1:
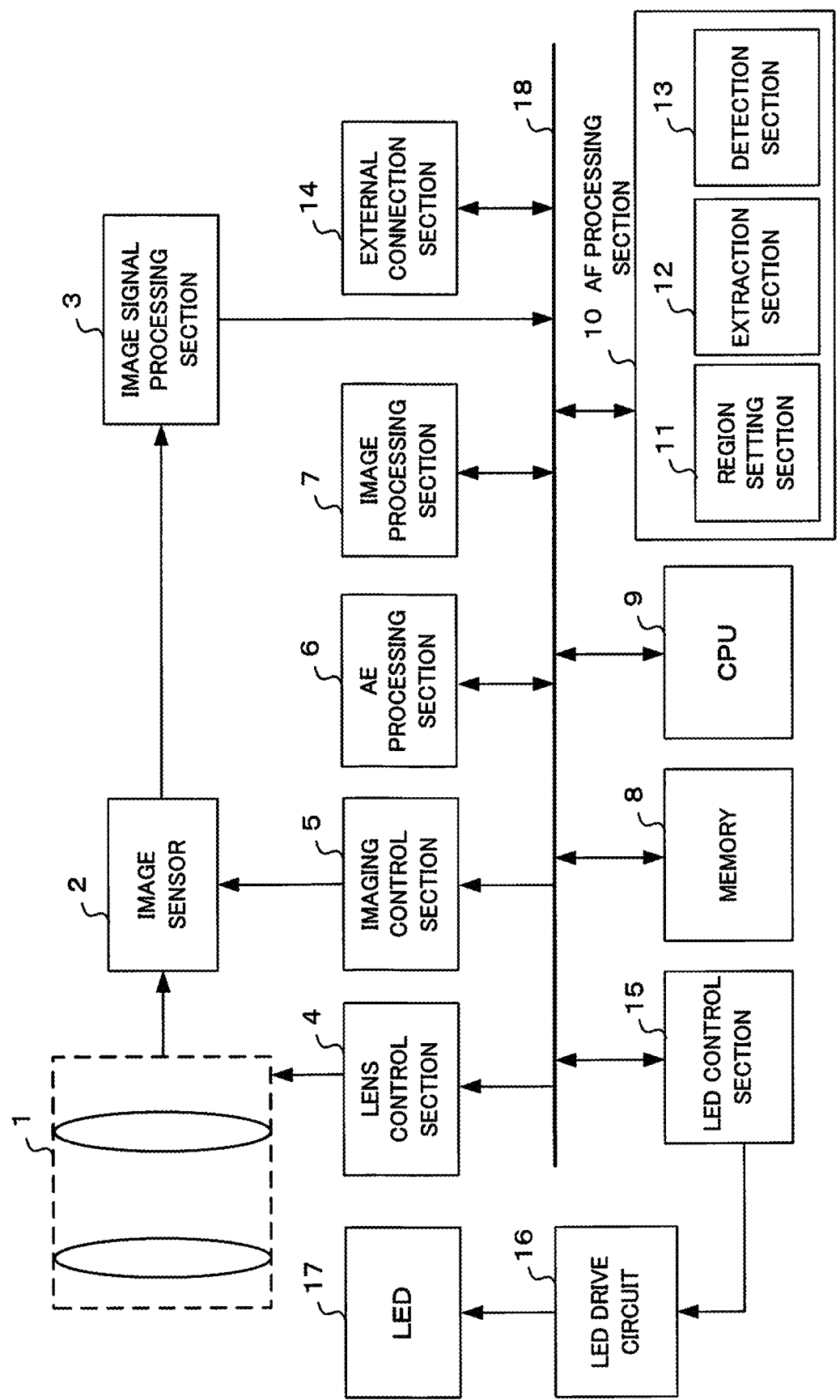
FIG. 1 is a block diagram showing overall structure of a cell observation device of one embodiment of the present invention.

FIG. 1 is a block diagram showing electrical structure of a cell observation device of this embodiment. The optical system 1 includes a focus lens, which is a prime lens or a zoom lens, and forms an optical image of a specimen. This optical system 1 is moved in an optical axis direction using a lens drive motor and a lens drive mechanism, and performs focusing of an image of a specimen such as cells. The optical system 1 may also be an entire group extending type with which all groups of a lens formed for focusing are moved integrally in an optical axis direction. While FIG. 1 does not show an aperture and mechanical shutter on the optical axis of the optical system 1, these components may be provided, or they may be omitted.

An image sensor 2 is an image sensor such as a CCD (Charge Coupled Device) image sensor or a CMOS (Complementary Metal Oxide Semiconductor) image sensor, and generates an image signal by subjecting an image that has been formed by the optical system 1 to photoelectric conversion. The image sensor 2 is connected to an imaging control section 5. The imaging control section 5 has an imaging control circuit, and performs charge storage control and control of image signal readout for the image sensor 2 in accordance with control signals from a CPU (Central Processing Unit) 9. The image sensor 2 functions as an imaging section (image sensor) that images a specimen. This image sensor outputs an image signal.

An image signal processing section 3 has an image signal processing circuit, is input with an image signal from the image sensor 2, performs processing such as A/D conversion, and outputs image data to a bus 18. This image data is input to an AE processing section 6, image processing section 7 and AF processing section 10 etc. and subjected to processing. The AE processing section 6 has an AE (automatic exposure control) circuit, detects brightness of a specimen etc. based on image data, and outputs detection results to the CPU 9. The CPU 9 performs control of imaging so that an image signal from the image sensor 2 becomes correct, based on brightness information. The image processing section 7 has an image processing circuit and subjects image data to various image processing such as OB (Optical Black) subtraction processing, white balance correction, demosaicing processing, edge enhancement processing, and image compression and image expansion.

The AF processing section 10 has an AF (automatic focus adjustment) circuit, and has a region setting section 11, extraction section 12, and detection section 13. The region setting section 11 sets some or all regions within a taken image as focus detection areas. This setting may be performed manually by the user, and also, if a taken image has been subjected to image analysis and cells etc. detected, that area may be set automatically as a focus detection area.

The extraction section 12 has a filter circuit, and extracts signal components of a specified frequency band from within image data of a focus detection area that was set by the region setting section 11. The extraction section 12 extracts high-frequency signal components of one or a plurality of frequency bands, for a single focus detection area. Also, high-frequency signal components are extracted using a digital high-pass filter, for example.

The detection section 13 has a detection circuit (evaluation value detection circuit) such as an integration circuit, and calculates focus evaluation value (corresponding to contrast) by integrating signal components that have been extracted. This focus evaluation value becomes a bigger value as degree of focus becomes higher. Calculation of focus evaluation value is performed for each of a plurality of frequency bands. The detection section 13 functions as an AF detection circuit (evaluation value calculation section) that calculates an evaluation value that has a larger value as degree of focus increases, based on an image signal output by the image sensor. It should be noted that "a larger value as degree of focus increases" may be a value that changes in accordance with degree of focus. For example, in a case where reference value is made a large value, and evaluation value is calculated by subtracting degree of focus from this reference value, a value becomes smaller as degree of focus increases, and this type of situation is included in "a larger value as degree of focus increases". It may also be a value where positive and negative are reversed.

A focus evaluation value that has been calculated by the detection section 13 is output to the CPU 9. The CPU 9 performs focus adjustment of the focus lens of the optical system 1 by means of the lens control section 4. It should be noted that within the processing of the AF processing section 10 functions of the region setting section 11 etc. may also be implemented in software by the CPU 9 and a program.

The lens control section 4 has a lens control circuit, and performs drive control of a lens drive motor based on a drive command for the focus lens from the CPU 9. As drive control for the focus lens, there are scan drive and focus drive. Scan drive is drive that moves the focus lens to an initial position, and moves the focus lens from this initial position to an endpoint or a specified target position. Image data is acquired while performing scan drive, and focus evaluation values (contrast values) are calculated based on image data that has been acquired by the detection section 13. In-focus position is calculated based on this focus evaluation value. Focus drive is drive that moves the focus lens to an in-focus position that was calculated using scan drive. As a result of this focus drive it is possible for the optical system 1 to focus on a specimen, such as cells.

An external connection section 14 is an interface for connecting the cell observation device and an external device (for example, a server that controls a cell observation device). An LED (Light Emitting Diode) 17 is a light source for illuminating a specimen such as cells, and lighting control (control of commencement of light emission and stopping of light emission) of the LED 17 is performed by an LED drive circuit 16 in accordance with control signals from an LED control section 15. The LED control section 15 has an LED control circuit, and performs lighting control of the LED 17 using this control circuit. It should be noted that the CPU 9 may have the function of the LED control section 15, and perform lighting control.

The CPU 9 performs control for each section within the cell observation device in accordance with a program that is stored in a memory 8. The CPU 9 is a controller (processor) for performing overall control of the cell observation device, and the CPU 9 is arranged as part of a so-called ASIC (Application Specific Integrated Circuit). Besides the CPU, there are also peripheral circuits in this ASIC. As peripheral circuits there may be some or all of the previously described lens control circuit, imaging control circuit, AE control circuit, image processing circuit, LED control circuit, and AF processing circuit etc.

The controller, such as the CPU 9, functions as a controller (in-focus position detection section) that changes focus position of the imaging section to execute an imaging operation by the imaging section, calculates evaluation values using the evaluation value calculation section, and detects focus position where focus is achieve based on the evaluation values. This controller detects a minimum evaluation value between focus positions of a plurality of peaks, when the plurality of peaks of evaluation value have been detected at different focus positions (refer, for example, to position of frame 6 in FIG. 8 and S23 in FIG. 10), and, when a first difference between a first peak, among a plurality of peaks (for example, position of frame 4 in FIG. 8), and a focus position of a minimum, and a second difference between a minimum and a second peak among a plurality of peaks (for example, the position of frame 9 in FIG. 8), are within respective specified ranges (refer, for example to S87 and S93 in FIG. 16), detects a focus position where focus is achieved based on focus position of the minimum. This controller may also make the specified ranges corresponding to the first difference and the second difference the same, or make them different.

Also, when at least one of a third difference between an evaluation value of a first peak (refer, for example, to focus evaluation value for frame 4 in FIG. 8) and a minimum evaluation value (refer, for example to focus evaluation value of frame 6 in FIG. 8), and a fourth difference between an evaluation value of a second peak (refer, for example, to evaluation value for frame 9 in FIG. 8) and a minimum evaluation value exceeds a given value (refer, for example, to Th1 to Th3 in FIG. 8), the controller detects a focus position where focus is achieved based on minimum focus position. It should be noted that the controller may calculate at least one of the third difference between evaluation value of the first peak and minimum evaluation value, and the fourth difference between evaluation value of the second peak and minimum evaluation value, and in the event that the calculated third difference or fourth difference exceeds a given value, detect focus position where in-focus is achieved based on minimum focus position.

Also, the controller does not perform detection of focus position based on minimum focus position when at least one of the third difference and the fourth difference is smaller than a second given value (refer, for example, to Th1 to Th3 in FIG. 8). The controller may also detect focus position where focus is achieved based on minimum focus position in the event that the third difference and the fourth difference exceed respectively different given values. Also, in this case, the controller may set different given values for the fourth difference, depending on the third difference.

The controller also detects evaluation value of a first peak, and if a minimum evaluation value is further detected sets a range for detecting a second peak (refer, for example, to setting of an increasing counter to "8" as a local minimum detection end position in FIG. 8, and to S33 in FIG. 10).

Figure 7:
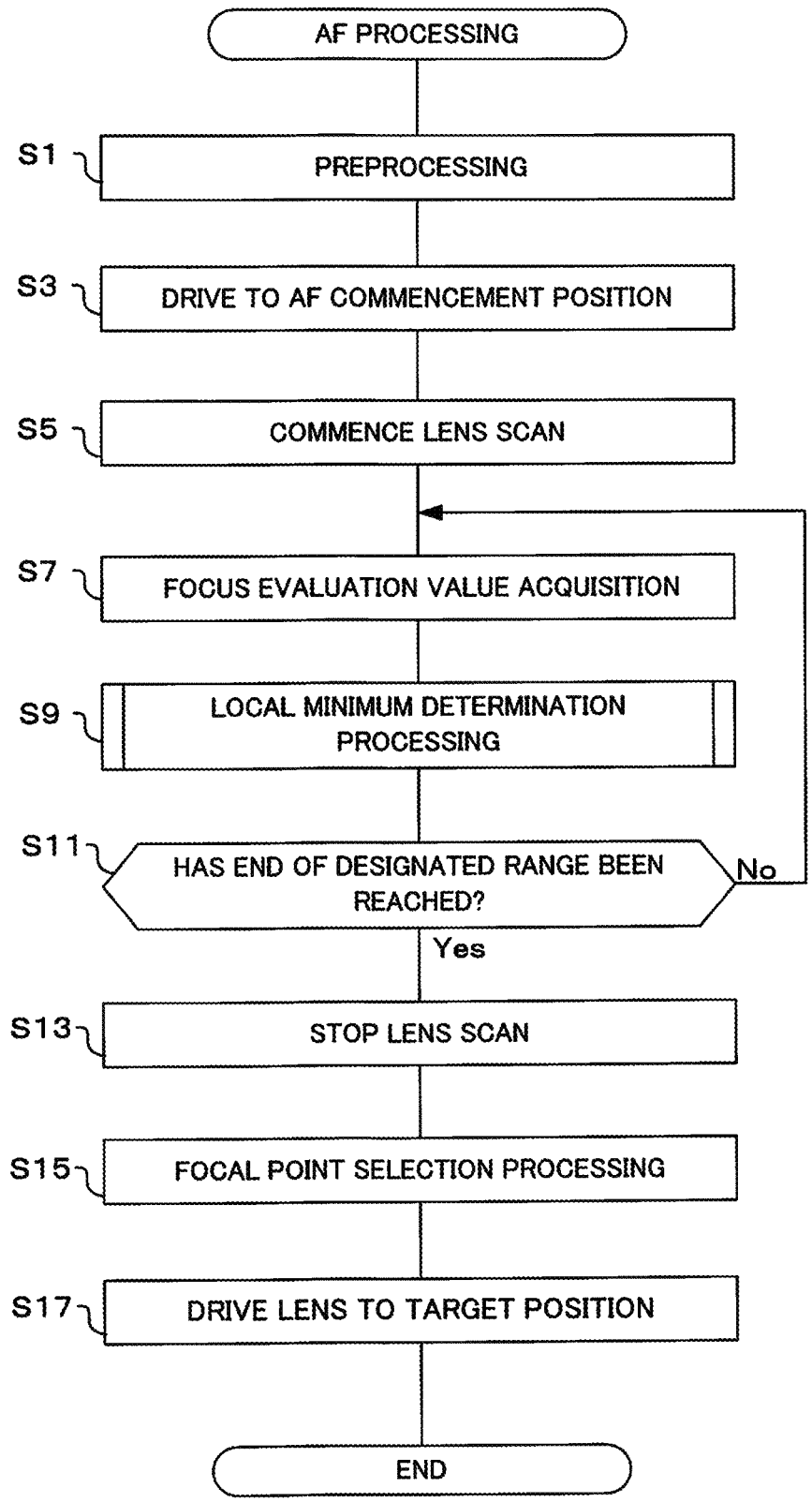
FIG. 7 is a flowchart showing contrast AF operation of the cell observation device of one embodiment of the present invention.

The controller also calculates evaluation value using the evaluation value detection section by changing focus position a specified amount at a time to execute an imaging operation using the imaging section (refer, for example, to S5 and S7 in FIG. 7), and detects focus position where focus is achieved by interpolation using evaluation values for focus positions before and after a minimum focus position (refer, for example, to S9 and S13 in FIG. 7).

The memory 8 includes electrically rewritable volatile memory and non-volatile memory, and as well as the previously described programs stores various data such as image data, and various adjustment values for the cell observation device.

Next, a case where focus evaluation value becomes a double peak will be described using FIG. 2. The dashed lines represent illumination light L, which is irradiated as light that is substantially parallel to a cell 81, which is a specimen that is irradiated by the light of the LED 17. This illumination light L that has been irradiated passes through the cell 81. It should be noted that in FIG. 2, reference 81b represents an image of a cell 81 at the imaging surface position (p). Also, a portion where intersecting diagonals have been applied in cells 81 and 81b shows a nucleus of a cell.

When the illumination light L passes through a cell 81, since the shape of the cells 81 is a projecting shape, a light beam is refracted and a light condensing effect is produced. Therefore, when the illumination light L that has passed through the cell 81 forms an image on an imaging surface p by means of the optical system 1, if there is deviation from the focus position sparseness and density (light beam disparity) will arise in the light beam, and sparse portions (dark portions) and dense portions (bright portions) will occur in the image of the specimen. In a case where sparseness and density arise in the light beam, a focus evaluation value (contrast value) causes a peak to be generated around a best focus position (corresponding to imaging surface position p). A case where focus evaluation value becomes a double peak will be described later using FIG. 3.

For a light beam that has passed through the cell 81 and the optical system 1, as an imaging optical system, at imaging surface position (r), which is at a nearer side than the best focus position, light beams becomes dense in a region of low refractive index close to a cell boundary, while on the hand light beams become sparse in a region of high refractive index inside a cell. As a result close to a cell boundary becomes bright while inside a cell boundary becomes dark. At an imaging surface position (p), which is the best focus position, light beam density becomes uniform, and as a result an observation image of a cell becomes distinct and easy to visually recognize. At imaging surface position (q) which is behind the best focus position light beams become sparse in a region of low refractive index close to a cell boundary, but become dense in a region of high refractive index inside a cell boundary. As a result, close to a cell boundary becomes dark, while inside as cell becomes bright.

Figure 4A:
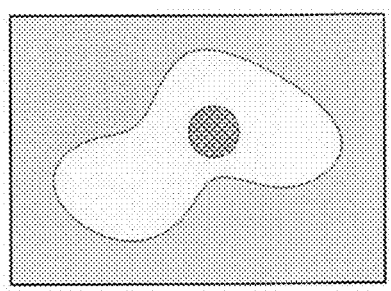
FIG. 4A to FIG. 4C are drawings showing examples of taken images, in a cell observation device of one embodiment of the present invention.

As has been described above, sparseness and density of light beams in the vicinity of a cell boundary differs depending on the imaging surface position. As a result in an image of the cells 81a at imaging surface position (r) a boundary of the cell 81 becomes white and inside the cell boundary becomes black, as shown in FIG. 4C. Also, an image of the cell 81 at imaging surface position (p) becomes a focused image, as shown in FIG. 4A. As a result, this taken image is an image at the best focus position Pb (corresponding to position p in FIG. 2), and is suitable for observing a cell 81 that is in focus. Also in an image of the cell 81 at imaging surface position (q) a boundary of the cell 81 becomes black and inside the cell boundary becomes white, as shown in FIG. 4B.

Figure 2:
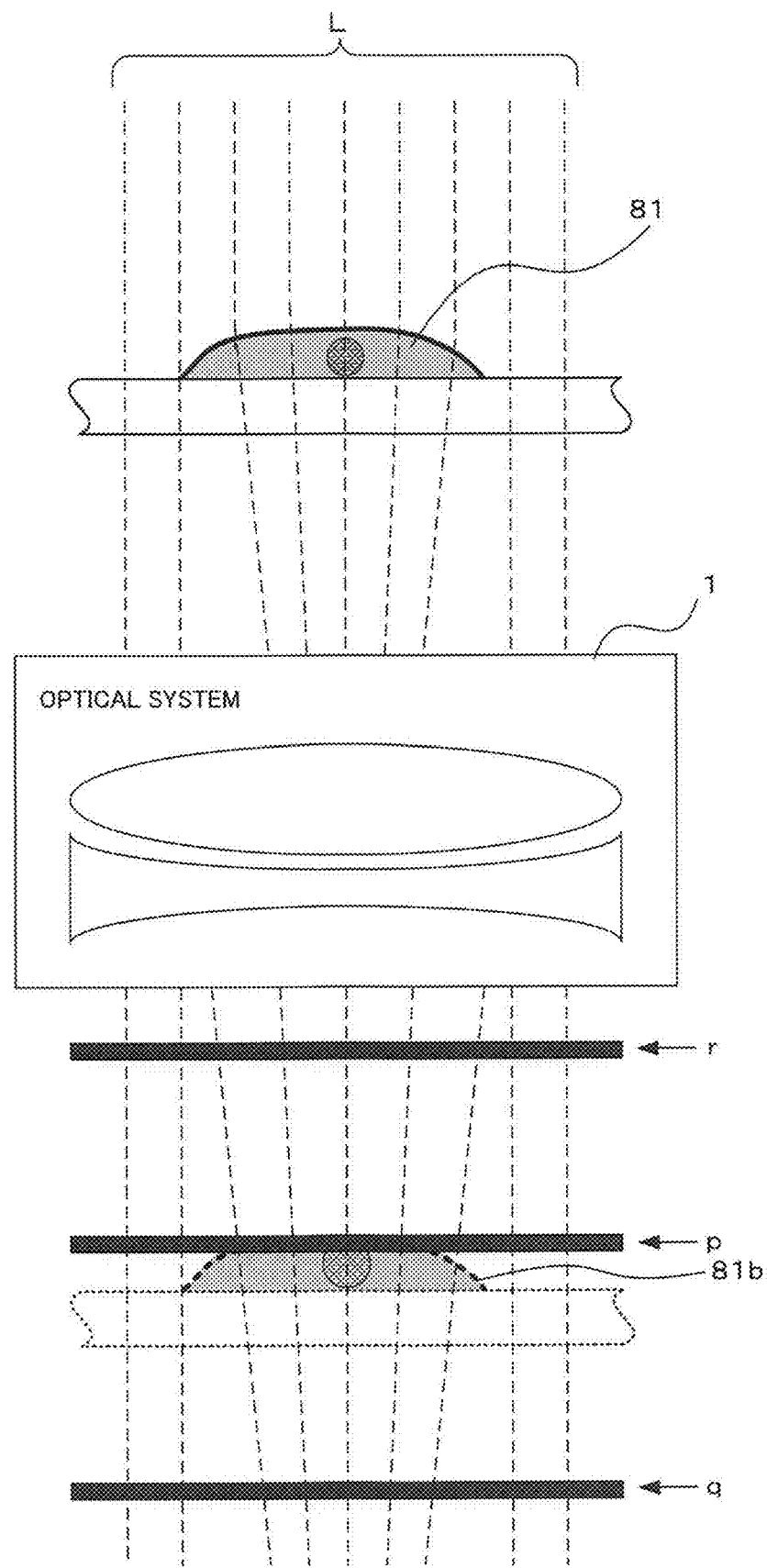
FIG. 2 is a drawing showing light paths of light beams that have passed through a cell, in the cell observation device of one embodiment of the present invention.
Figure 3:
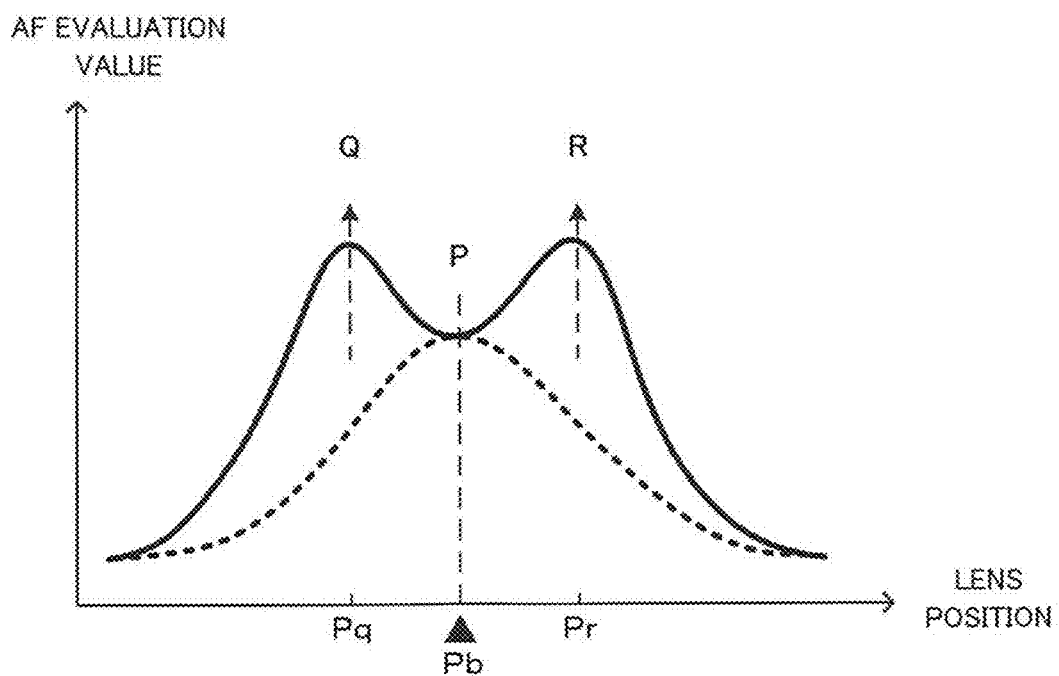
FIG. 3 is a graph showing an example of a relationship between lens position and focus evaluation value for the imaging section (in a case where there are two peaks), in the cell observation device of one embodiment of the present invention.

FIG. 3 shows change in focus evaluation value, for a case where sparseness and density have occurred in transmitted light flux due to a light condensing effect caused by the projecting shape of the cell 81, as a solid line, as shown in FIG. 2. In FIG. 3, the line shown by a dashed line shows change in focus evaluation value for a case where there is not a light condensing effect.

In FIG. 3, the line shown by a solid line shows change in focus evaluation value for a case where there is a light condensing effect. At lens position Pq and lens position Pr of the focus lens of the optical system 1, focus evaluation value becomes a maximum value, and at the best focus position Pb the focus evaluation value becomes a local minimum value.

Figure 4B:
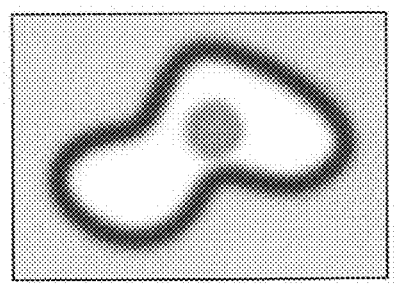
Figure 4C:
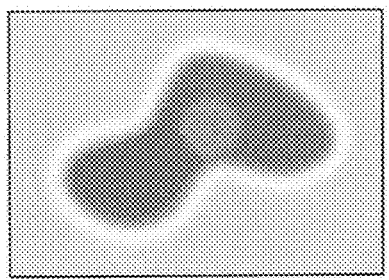

FIG. 4A to FIG. 4C show taken images of a cell at each point of lens positions Pq, Pb and Pr in FIG. 3. As was described previously, the image shown in FIG. 4A is a taken image at the position Pb point in FIG. 3. The image shown in FIG. 4B is a taken image at the position Pq point in FIG. 3, and an image, that has been formed that is dark in a region of high refractive index and bright in a region of low refractive index (called a positive or dark contrast), is formed. The image shown in FIG. 4C is at taken image at the position Pr point in FIG. 3, and an image, that has been formed that is bright in a region of high refractive index and dark in a region of low refractive index (called a negative or bright contrast), is formed.

Next, a relationship between contrast characteristic and lens position for a non-colored cell will be described using FIG. 5 to FIG. 6. The horizontal axis in FIG. 5 and FIG. 6 shows lens position, and the vertical axis shows contrast (focus evaluation value).

Figure 5:
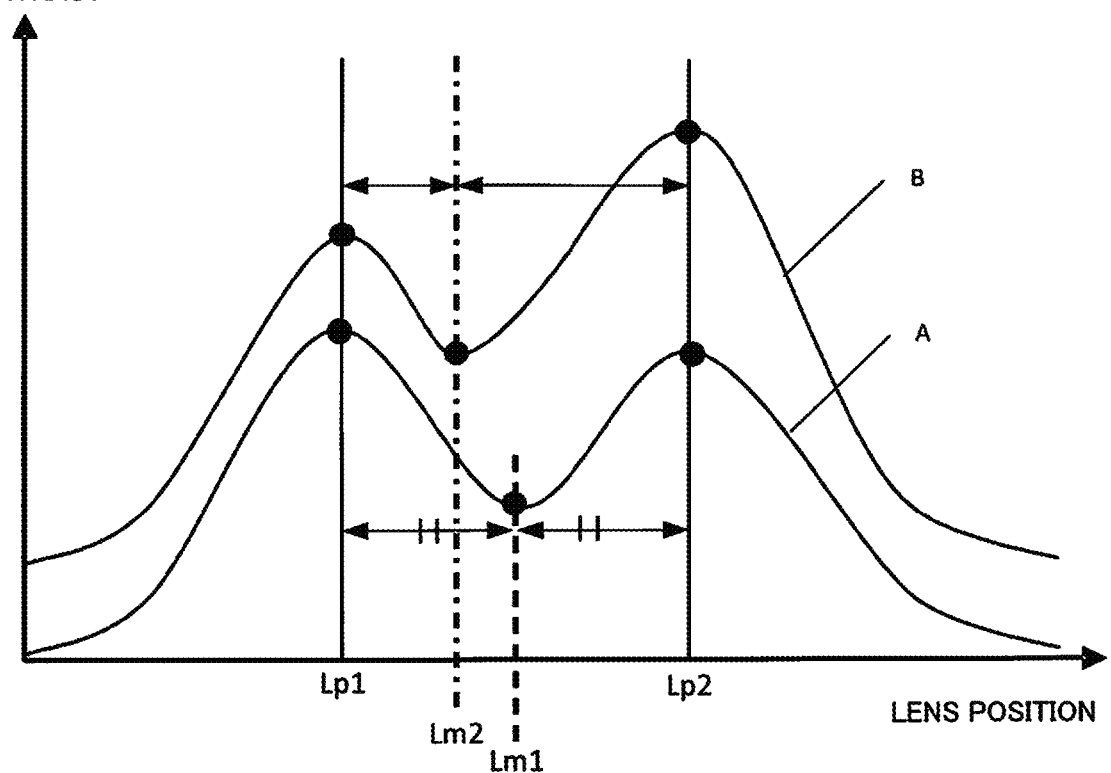
FIG. 5 is a graph showing a relationship between contrast characteristic and lens position for a non-stained cell, in the cell observation device of one embodiment of the present invention.
Figure 6:
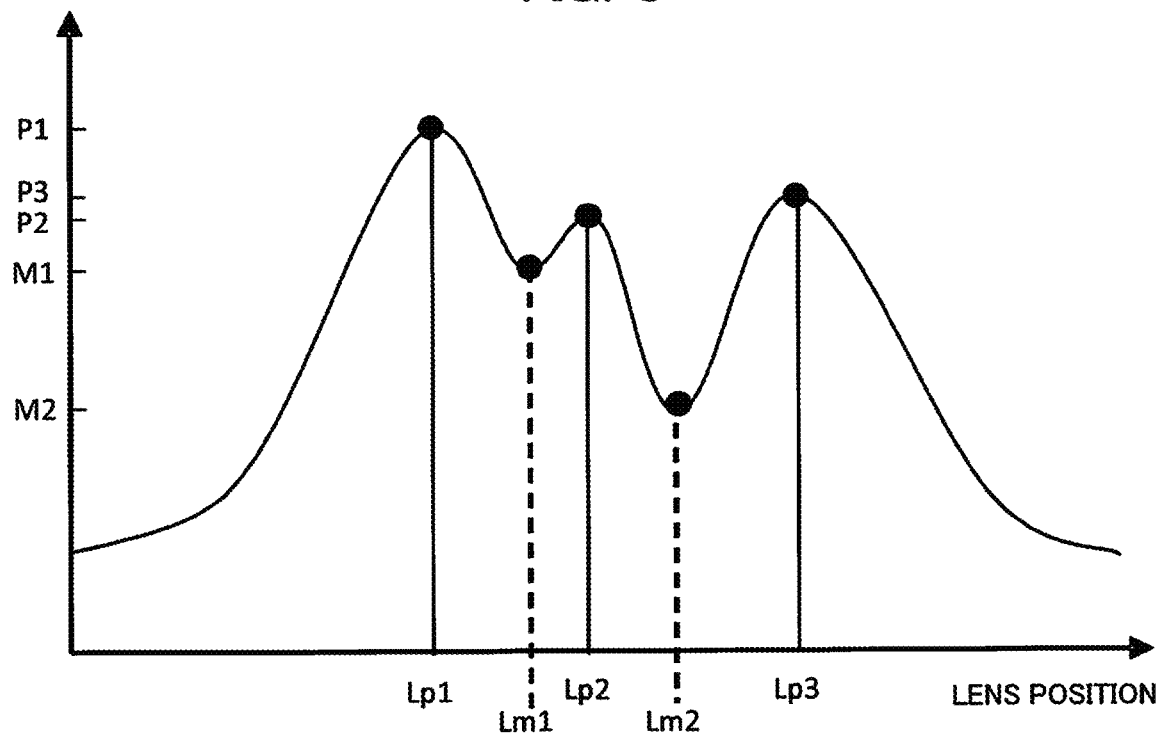
FIG. 6 is a graph showing a relationship between contrast characteristic and lens position for a non-stained cell, in the cell observation device of one embodiment of the present invention.

Contrast shown by the solid line A in FIG. 5 becomes respective peaks (maximum) at lens positions Lp1 and Lp2, and becomes a local minimum at lens position Lm1, and this position constitutes a local minimum position. Specifically, with the example shown by this solid line A two contrast peaks are detected, as was shown in patent publication 1, and by making a position between these two peaks (Lm1) a focus position it is possible to drive the focus lens to the in-focus position. It should be noted that a lens spacing (lens distance) from lens position Lp1 to lens position Lm1 and a lens spacing (lens distance) from lens position Lm1 to lens position Lp2 is the same lens spacing (lens distance). Also, since a peak corresponding to lens position Lp1 becomes closer while reducing toward middle position Lm1 it is called a "reducing side peak", and since a peak corresponding to lens position Lp2 becomes closer while increasing from the middle position Lm1 it is called an "increasing side peak".

However, a double peak contrast shape becomes various shapes due to types of cell and measurement environment, and so an intermediate position becoming equidistant between two peaks etc. is not limited to a local minimum position. For example, with the example shown by the solid line B in FIG. 5, similarly to the example shown by the solid line A, contrast becomes a peak at lens positions Lp1 and Lp2. However, with the example shown by solid line B, lens position for a local minimum value of contrast is Lm2, which differs from lens position Lm1 of solid line A. Specifically, with solid line B a local minimum value of contrast is not an intermediate position that is equidistant between lens positions Lp1 and Lp3.

Also, a double peak contrast shape is not limited to a single local minimum appearing between two peaks. With the example shown in FIG. 6, a contrast value becomes peak values P1, P2 and P3 at lens positions Lp1, Lp2 and Lp3, and becomes local minimums M1 and M2 at lens positions Lm1 and Lm2. With this example, a true local minimum value for contrast value at lens position Lm2 becomes M2. However, if a local minimum position is detected from lens position Lp1 for peak (P1) in an Lp2 position direction for peak (P2), a local minimum is detected at lens position Lm1, and so there may be cases where lens position Lm1 is erroneously determined to be local minimum, and a false local minimum detected.

In this way, with a method of making a position where there is no contrast change at a close-up end and an infinity end a local minimum, as disclosed in patent publication 1, or with a method where a focus lens is driven in one direction from a peak position and a local minimum detected using a contrast magnitude relationship, a false local minimum position Lm1 will be erroneously detected as a true local minimum position.

Next, AF processing of this embodiment will be described using FIG. 7 to FIG. 16. FIG. 7 is a flowchart showing AF processing, and this flow is executed by the CPU 9 controlling each section within the cell observation device in accordance with program code that has been stored in the memory 8 (the same also applies to the flowcharts shown in FIG. 10 to FIG. 16 which will describe later).

If the flow shown in FIG. 7 is commenced, preprocessing is first performed (S1). Here, the CPU 9 sets exposure control values for AF based on brightness information from the AE processing section 6, and performs exposure control so as to achieve appropriate exposure using the imaging control section 5. Also, a focus detection area is set by the region setting section 11.

Once preprocessing has been performed, next there is drive to an AF commencement position (S3). Here, the CPU 9 moves the focus lens position of the optical system 1 to a commencement position by means of the lens control section 4. In a case where the focus lens is moved by a stepping motor, focus lens position is detected using a number of pulses that have been input to the stepping motor from a point in time when a reference point has been passed. Also, in a case where an encoder is provided that measures focus lens position, focus lens position may be detected based on encoder output. With this embodiment, a specimen such as cells, which is the subject of focus adjustment, is within a specified range, and focusing is performed in a designated range that is set from an external device that has been connected to the external connection section 14, and so one end of the designated range is made a start position. Therefore, information on AF commencement position and an end point (terminus) of the designated range is input from the external connection device 14 as the designated range. Also, it may be possible to set AF commencement position in the cell observation device, without being limited to the external connection device.

Once the focus lens has been driven to the AF commencement position, next lens scan is commenced (S5). Scan drive is drive for detecting focus evaluation value using the detection section 13. Here, the CPU 9 moves the focus lens of the optical system 1 at a specified speed by means of the lens control section 4.

If lens scan has been commenced, next focus evaluation value is acquired (S7). Here, if image data for a single frame is acquired while performing focus lens drive, the extraction section 12 extracts frequency signal components of frequency bands that have been designated from image data of a focus area that has been set by the region setting section 11, and the detection section 13 calculates focus evaluation value (corresponding to contrast) by calculating image data for signal components that have been extracted. It should be noted that in a case where a plurality of frequency bands are designated, focus evaluation values for a plurality of frequency bands are obtained for a single focus detection area.

Once focus evaluation values have been obtained, next local minimum determination processing is performed (S9). Here, a local minimum of contrast (focus evaluation value) is determined using focus evaluation values that were acquired in step S7. As was described using FIG. 5 and FIG. 6, there are cases where a plurality of peaks appear, and cases where a plurality of local minimums appear. In this kind of situation also, with this embodiment a true local minimum is detected. Detailed operation of this local minimum determination processing will be described later using FIG. 8 to FIG. 10.

Once local minimum determination processing has been performed, next it is determined whether or not a designated range end point has been reached (S11). Here, it is determined whether or not end point of the designated range that was input from the external connection device 14 has been reached. Specifically, it is determined whether an endpoint of the designated range, that is an endpoint in an opposite direction to the scan commencement position, has been reached. If the result of this determination is that the endpoint has not been reached, processing returns to step S7, and acquisition of focus evaluation values continues.

If the result of determination in step S11 is that endpoint of the designated range has been reached, lens scan is stopped (S13). The CPU 9 stops scan drive of the focus lens because focus evaluation values have been acquired for the designated range.

Next, focal point selection processing is performed (S15). As was described previously, when acquiring focus evaluation values there may be cases where calculation is performed in a plurality of frequency bands. In this case, in this step, it is determined which peak of which frequency band, among the plurality of focus evaluation values, will be selected as an in focus position. Focal point selection processing may be omitted in the event that acquisition of focus evaluation values is only performed in a single frequency band. Also, in this step, a focus position (lens position) at which focus is achieved is detected by performing interpolation using evaluation values for focus positions (lens positions) before and after a minimum focus position (lens position) that has been obtained by the local minimum determination processing of step 9.

If focal point selection processing has been performed, next the lens is driven to a target position (S17). Here, the CPU 9 drives the focus lens to an in-focus position that was selected in step S13, as a target position, by means of the lens control section 4. If the focus lens has been driven to the target position, the AF processing operation is terminated.

Next, one example of the local minimum determination of step S9 will be described using FIG. 8 and FIG. 9. The graphs shown in the upper portions of FIG. 8 and FIG. 9 show change in lens position, and change in focus evaluation value (contrast) accompanying this change in lens position, over time.

Figure 9:
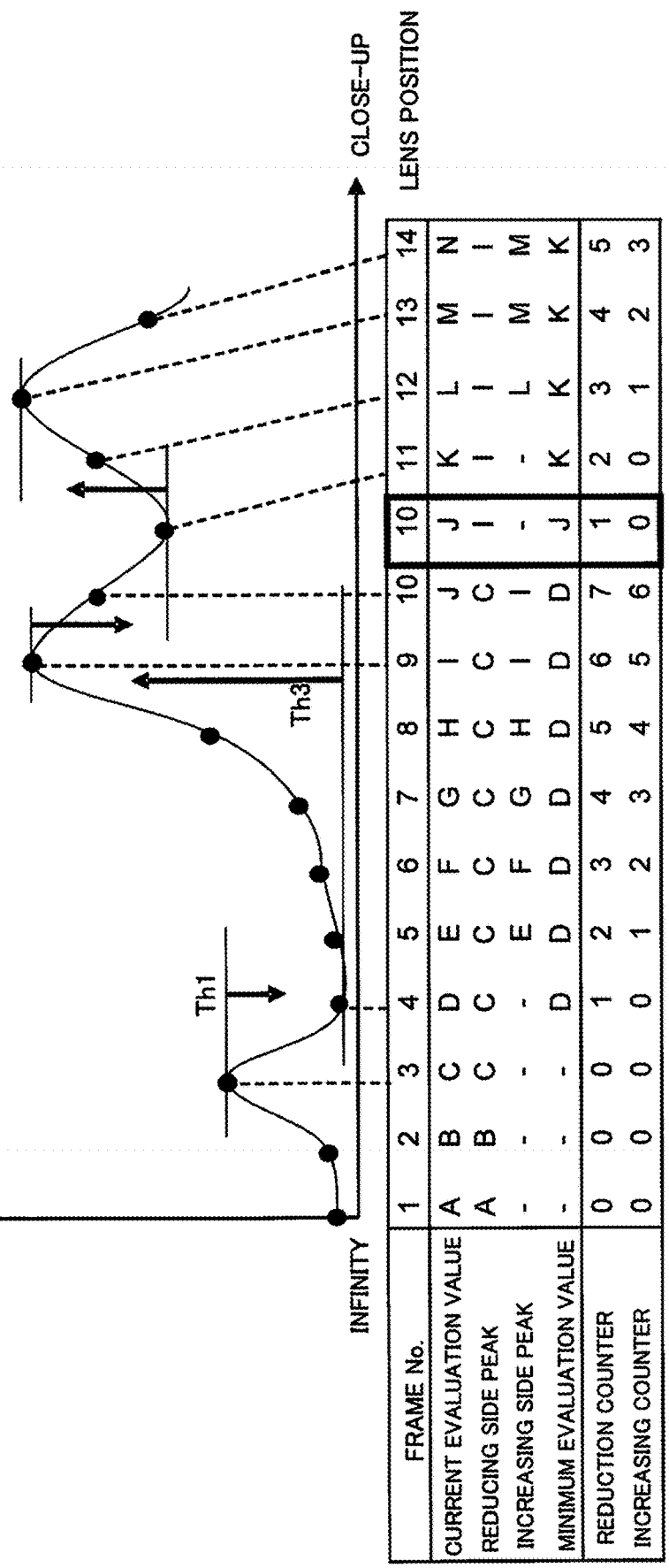
FIG. 9 is a drawing showing one example of local minimum determination processing, in a case where there is a contaminant, in the cell observation device of one embodiment of the present invention.

Also, the table shown in the lower portions of FIG. 8 and FIG. 9 show values for the items described below in accordance with each frame No.

reducing side peak: this is a maximum value of focus evaluation value for reduction amount calculation, and in FIG. 8 is focus evaluation value of a lens position corresponding to frame No. 4 increasing side peak: this is a maximum value of focus evaluation value for increase amount calculation, and in FIG. 8 is focus evaluation value of a lens position corresponding to frame No. 9 minimum evaluation value: this is minimum value of focus evaluation value within a local minimum detection period, and in FIG. 8 is a focus evaluation value for a lens position corresponding to frame No. 6 reduction counter: frame number counter for from reducing side peak until minimum evaluation value is reached increasing counter: frame number counter for from minimum evaluation value until increasing side peak is reached If the detection section 13 of the AF processing section 10 is input with image data for a single frame from the image sensor 2, values such as the current evaluation value and focus evaluation values at the reducing side peak and the increasing side peak, described above, are calculated. Also, the letters A-N entered in the current evaluation value in FIG. 8 and FIG. 9 represent focus evaluation value. Also, 0-7 for the reduction and increasing counters represent count values, and are counted by a counter within peripheral circuitry of the CPU.

A local minimum detection period and respective distances from a peak to a minimum, and from a minimum to another peak, are defined (set) as follows in the examples shown in FIG. 8 and FIG. 9. Local minimum detection commencement is a lens position corresponding to a frame No. in which a count value of the reduction counter has become "1" (refer, for example to S65 in FIG. 14, and reduction counter for Frame No. 5 in FIG. 8), while local minimum detection end is a lens position corresponding to a frame No. in which count value of the increasing counter has reached a local minimum detection end control value (refer, for example, to S33 in FIG. 10, and the increasing counter corresponding to frame No. 10 in FIG. 9). In the event that the increasing counter count value has reached the local minimum detection end control value, local minimum detection processing is stopped. Also, respective distances from a reducing side peak to a minimum evaluation value, and from a minimum evaluation value to an increasing side peak (lens position spacing) are set (defined) by the reduction counter and the increasing counter.

With the examples of FIG. 8 and FIG. 9, in the reduction counter and increasing counter count values of "4" are respectively made a distance defined value. If the reduction counter value or the increasing counter value exceeds the distance-defined value, a minimum value is not determined to be a local minimum. Also, regarding end position for local minimum determination (local minimum detection end control value) with the example shown in FIG. 8, an increasing counter is set (defined) to "5", and with the example shown in FIG. 9, an increasing counter is set (defined) to "6". It should be noted that in a case where a focus lens is driven by a stepping motor, a lens position spacing (distance) can be represented using difference in number of applied pulses. It should be noted that these values are exemplifications only, and other values may be adopted.

Setting of change amount threshold value is stipulated as follows with the example shown in FIG. 8. Change amount may be a reduction amount from a reducing side peak to a minimum evaluation value, and an increase amount from a minimum evaluation value to an increasing side peak. Downward pointing arrows in FIG. 8 show reduction amount threshold values, while upward pointing arrows show increase amount threshold values. With the example shown in FIG. 8 there are three settings as threshold values for change amount, with threshold values maintaining a relationship of Th3>Th2>Th1, and threshold value Th1 being the smallest threshold value.

Also, as a further stipulation for change amount that can be determined as a local minimum, increase rate is changed in accordance with a threshold value that reduction rate falls within. For example, if Th1 is set as a reduction rate threshold value, an increase rate threshold value is also set to Th1. It should be noted that with the example shown in FIG. 8, an absolute value of increase amount threshold value and an absolute value of reduction amount threshold value are the same, but the absolute values of the increase amount threshold value and the reduction amount threshold value may be set so as to be different.

In FIG. 8, in frame Nos. 1 to 6 reducing side peak setting, minimum evaluation value setting, reduction counter setting, and calculation of reduction rate are performed. This will be specifically described. First, focus evaluation values from Frame No. 1 to Frame No 4 continuously increase (in the drawing, current evaluation value increases from A to D), and a reducing side peak is also updated (in the drawing, reducing side peak is also updated from A to D).

In frame No. 4 focus evaluation value becomes a peak, and this peak is called a "reducing side peak". From frame No. 4, at frame No. 5, focus evaluation value has reduced by more than a reduction amount threshold value Th1, and so a peak is determined. In frame No. 5 focus evaluation value has reduced, and in frame No. 4 the reduction counter was at 0, and so current evaluation value (E) is set as a minimum evaluation value in frame No. 5. If minimum evaluation value has been set, then the reduction counter is set to 1 (refer to S65 in FIG. 14), and local minimum detection is commenced.

It should be noted that reduction rate is calculated with the following equation (1).

$${\{(\text{reducing side peak})-(\text{minimum evaluation value})\}}/{\text{reducing side peak}} \quad (1)$$

With the example shown in FIG. 8, reduction rate at the time point of frame No. 5 becomes (D−E)/D.

If the reduction counter has been set to 1 in frame No. 5, thereafter the reduction counter is counted up until local minimum detection completion. It should be noted that a reducing side peak focus evaluation value is not updated from after commencement of local minimum detection until local minimum detection completion (with the example of FIG. 8, completion of local minimum detection remained "D" without being updated until frame No. 11). With FIG. 8, evaluation value for frame No. 5 becomes until frame No. 11, and in frame No. 6 evaluation value is reduced to less than minimum evaluation value (E), which means that minimum evaluation value is updated to (F) (refer to S55 in FIG. 13).

Next, in frame Nos. 7 to 9, setting of increasing counter, setting of increasing side peak and calculation of increase rate are performed. From frame No. 7 to frame No. 9 the focus evaluation value is increasing. Specific description will be given in the following. Since in frame No. 7 focus evaluation value increases from frame No. 6, minimum value (F) is not updated. Here, if it is determined that there is a minimum value, the increasing counter is set to 1 (refer to S77 in FIG. 15). After that, the increasing counter is counted up unless the minimum value is updated.

The increasing side peak is set to a focus evaluation value for a point in time when the increasing counter was set to 1 (frame No. 7), and following that the increasing side peak is updated in the event that a current focus evaluation value is larger than is larger than the increasing side peak. The increase rate is calculated in the event that increasing counter≠0. Increase rate is calculated using equation (2) below.

$${\{(\text{increasing side peak})-(\text{minimum evaluation value})\}}/{\text{minimum evaluation value}} \quad (2)$$

Next, in frame No. 11 local minimum detection is completed. This will be specifically described. In frame No. 9, the focus evaluation value reaches a peak, and focus evaluation value for frame No. 10 becomes smaller than the focus evaluation value for frame No. 9. Then, at frame No. 11, since the increasing counter has reached the local minimum detection end control value "5", local minimum detection is completed and local minimum determination is performed. At this point in time, evaluation values etc. are as described below.

reducing side peak: (D)
increasing side peak: (I)
minimum evaluation value: (F)

Once the above described evaluation values etc. have been obtained, local minimum determination is performed at the reducing side. Reducing side local minimum determination is determination with a maximum value of reduction rate and a reduction counter value at a point in time when the reduction rate has become maximum. With the example shown in FIG. 8, the largest reduction rate is (D−F)/D for frame No. 6, and the reduction counter at this point in time is "2". Also, since reduction (D−F) at this time is larger than the reduction amount threshold value Th1, this condition is satisfied, but on the other hand the threshold values Th2 and Th3 are not satisfied. Accordingly, at the reducing side the threshold value Th1 is being satisfied (minimum evaluation value F is not further down than the position of the downward arrow (threshold value Th2). Also, the reduction counter is "2", and less than or equal to distance defined value "4" is being satisfied, and so next increasing side local minimum determination is performed.

Increasing side local minimum determination will be described next. Increasing side local minimum determination is performed with a maximum value of increase rate and increasing counter value at the point in time when the increase rate becomes maximum. The largest increase rate is (I−F)/F in frame No. 9, the increase count at this point in time is "3", and distance defined value "4" or less is being satisfied. Here, with determination of increase amount, since the reduction amount only exceeds threshold value Th1, it is determined whether or not the increase amount exceeds Th2 or Th3 that are larger than Th1.

With the example shown in FIG. 8, a peak (I) for frame No. 9 is exceeding increase amount threshold values Th2 and Th3 with the minimum value (F) as a reference (increasing side peak I is higher up than the position of the upward arrows (threshold values Th2 and Th3)). It should be noted that in the event that the reduction amount threshold value exceeds only Th1, increase amount may also be determined by the fact that Th3 which is larger than Th1 is exceeded, without using threshold value Th2.

For both the reducing side local minimum determination and the increasing side local minimum determination described above, with the example shown in FIG. 8 respective conditions have been satisfied, which means that the minimum value (F) that was detected in the local minimum detection period (frame Nos. 1 to 11) is finally determined as a local minimum value.

Next, an example of local minimum determination under conditions that are different to those of FIG. 8 will be described using FIG. 9. As well as becoming a local minimum, depending on a cell, there may be cases where for a focus evaluation value a contrast peak also exists because of impurities (that are not transparent) such as dead cells or floating refuse etc. FIG. 9 shows this type of case, and in FIG. 9 a contrast peak due to impurity appears in frame No. 3 (evaluation value C), and a local minimum caused by a cell appears in frame No. 11 (evaluation value K). It should be noted that the table in the lower part of FIG. 9 has entries for items for each frame No., similarly to FIG. 8.

The local minimum detection period of FIG. 9, and respective distance defined values from a peak to a minimum and from a minimum to another peak, are as follows.

A local minimum detection end control value corresponding to an increasing counter value at the time of local minimum detection completion is made "6".

Distance defined values for reducing and increasing counters are respectively made "4".

Specifically, a local minimum detection end control value of the increasing counter at the time of local minimum detection completion differs from being "5" in the example shown in FIG. 8 in that it is "6" in the example shown in FIG. 9. The distance-defined values are the same in the examples shown in FIG. 8 and FIG. 9.

If operations from frame Nos. 1 to 10 are made the performing of the same processing as in FIG. 8, then detection of a local minimum value commences in frame No. 4, and since the increasing counter reaches a local minimum detection end control value (as described previously, the local minimum detection end control value is "6") in frame No. 10 local minimum detection is completed. At this point in time, evaluation values etc. are as described below.

reducing side peak: (C)
increasing side peak: (I)
minimum evaluation value: (D)
reducing amount maximum value: reduction amount at the time point of frame No. 4 (C–D)/C
increasing amount maximum value: increasing amount at the time point of frame No. 9 (I–D)/D Once the evaluation values are obtained as described above, reducing side local minimum determination is performed. Regarding the reducing side local minimum determination of FIG. 9, a reduction amount maximum value (C–D) satisfies threshold value Th1, and with the reduction counter at the point in time when reduction amount becomes a maximum being "1", distance defined value "4" or less is satisfied.

Next, increasing side local minimum determination is performed. Increase amount maximum value (I-D) exceeds threshold value Th3. However, the increasing counter at the point in time when increase amount becomes a maximum (frame 9) is "5", and distance defined value "4" or less is not satisfied. This means that minimum value (D) is not determined as a local minimum.

Next, initialization for the minimum detection operation is performed. Specifically, although minimum detection is completed in frame No. 10, minimum detection is constantly performed while scanning continues. At the time of commencement of the next minimum detection, each of the values is initialized, as shown within the bold border in the lower table of FIG. 9.

Specifically:

reducing side peak: maximum value of focus evaluation value (evaluation value I) from increasing counter 1 to local minimum detection completion increasing side peak: not designated for items shown by "-" within the bold border in FIG. 9, minimum evaluation value: focus evaluation value minimum value (evaluation value J) at time of local minimum detection completion reduction counter: increasing counter value at time of local minimum detection completion—increasing counter at increasing side peak position (6–5=1)

increasing counter: set to 0.

If initialization has been performed in frame No. 10, next, in frame No. 11, since evaluation value is reduced to less than the minimum evaluation value (J) the minimum evaluation is updated to (K). The reduction counter was "1" at the time of initialization, and so is updated to "2". Also, the reduction rate in frame No. 11 becomes (I–K)/I.

Next, in frame No. 12, since evaluation value increases from frame No. 11 the increasing counter is set to 1, and an increasing side peak is set to (L). Also, the increase rate in this frame becomes (L–K)/K. Subsequently, local minimum detection continues until the increasing counter reaches the local minimum detection end control value ("6" in the example shown in FIG. 9). Subsequent processing is the same as the content that was described in FIG. 8, and so is omitted.

In circumstances such as shown in FIG. 9, if a contrast magnitude relationship using lens position, and a method where a position where there is no change in contrast when performing lens drive to the close-up end and the infinity end is detected, as in a conventional example, are adopted, there is a risk that between an impurity peak (evaluation value C of frame No. 3) and one peak of a double peak of a cell (evaluation value I of frame No. 9), evaluation value (D) will be erroneously detected as a local minimum. However, in addition to change amount, by providing definition of distance between a peak and a minimum and between a minimum and a peak, as with this embodiment, it is possible to precisely detect a local minimum position even when there are various false local minimum contrast shapes.

Next, detailed operation of the local minimum determination processing in step S9 (refer to FIG. 7) will be described using the flowchart shown in FIG. 10. This flow is started if an image signal for a single frame is output from the image sensor 2.

If the flow for the local minimum determination processing of FIG. 10 is commenced, then it is first determined whether or not a previous evaluation value is smaller than a current evaluation value (S21). Here, determination is performed by comparing a current focus evaluation value that has been calculated from the image signal of the newest frame with a previous focus evaluation value. For the purpose of this determination, the previous focus evaluation value is temporarily stored in memory (refer to step S37 which will be described later).

If the result of determination in step S21 is that the previous evaluation value is smaller than the current evaluation value, update of a reducing side peak is performed (S25). In this case, there may be situations where the focus evaluation value is gradually increasing, as in frame Nos. 1 to 4 in FIG. 8. At this time, if the reduction counter is at 0, update of the reducing side peak is performed, and the previous focus evaluation value is replaced with a larger focus evaluation value. Detailed operation of this reducing side peak update will be described later using FIG. 11.

Once update of reducing side peak has been performed, update increasing side peak is performed (S27). In this case, there may be situations where the focus evaluation value is gradually increasing, as in frame Nos. 6 to 9 in FIG. 8. If it is detected that the reduction counter is at a minimum evaluation value, "1" is set, and counting up of the reduction counter is performed (refer to S65 and S67 in FIG. 14). In this step, if it is determined that the reduction counter is not 0, update of the increasing side peak is performed, and the previous focus evaluation value is replaced with a larger focus evaluation value. Detailed operation of this increasing side peak update will be described later using FIG. 12.

Returning to step S21, if the result of determination in this step is that the previous evaluation value is smaller than the current evaluation value, update of a minimum evaluation value is performed (S23). In this case, there may be situations where the focus evaluation value is gradually reducing, as in frame Nos. 5 to 6 and 10 to 11 in FIG. 8. In this case, whether to update or not update the minimum evaluation value is determined in accordance with whether or not the reduction counter is 0. Detailed operation of this minimum evaluation value update will be described later using FIG. 13.

If update of minimum evaluation value has been performed in step S23, or if update of increasing side peak has been performed in step S27, next update of the reduction counter is performed (S29). The reduction counter commences a count operation if the focus evaluation value reaches a reducing side peak. In this step, either setting the reduction counter to 1 or counting up the reduction counter is executed in accordance with whether or not the reduction counter is at 0, and whether or not the minimum evaluation value is the same as the current evaluation value. Detailed operation of this reduction counter update will be described later using FIG. 14.

Once update of the reduction counter has been performed, next update of the increasing counter is performed (S31). If the increasing counter passes the reducing side peak and the focus evaluation value becomes a minimum, counting up is commenced. In this step, either setting the increasing counter to 1 or counting up the increasing counter is executed in accordance with whether or not the increasing counter is at 0, whether or not the reduction counter is not 0, and whether or not the minimum evaluation value is the same as the current evaluation value. Detailed operation of this increasing counter update will be described later using FIG. 15.

If update of the increasing counter has been performed, it is next determined whether or not local minimum detection has been completed (S33). Local minimum detection is determined based on whether or not the increasing counter has reached the local minimum detection end control value (5 in the example shown in FIG. 8, 9 in the example shown in FIG. 9), as was described previously.

If the result of determination in step S33 is that local minimum detection has been completed, local minimum determination is performed (S35). Here, it is determined whether or not a minimum value of focus evaluation value within a detection range is a local minimum corresponding to an in-focus position, based on a determination reference of FIG. 8 and FIG. 9, using maximum reduction rate, maximum increase rate, increasing counter value, reduction counter value, etc. Detailed operation of this local minimum determination will be described later using FIG. 16.

If local minimum determination has been performed in step S35, or if the result of determination in step S33 was that local minimum detection has not been completed, next the current evaluation value is saved at the previous evaluation value (S37). As was described previously, in step S21 the previous evaluation value and the current evaluation value are compared, and so the current evaluation value is saved in memory. Once the current evaluation value has been saved, the originating flow is returned to.

Figure 11:
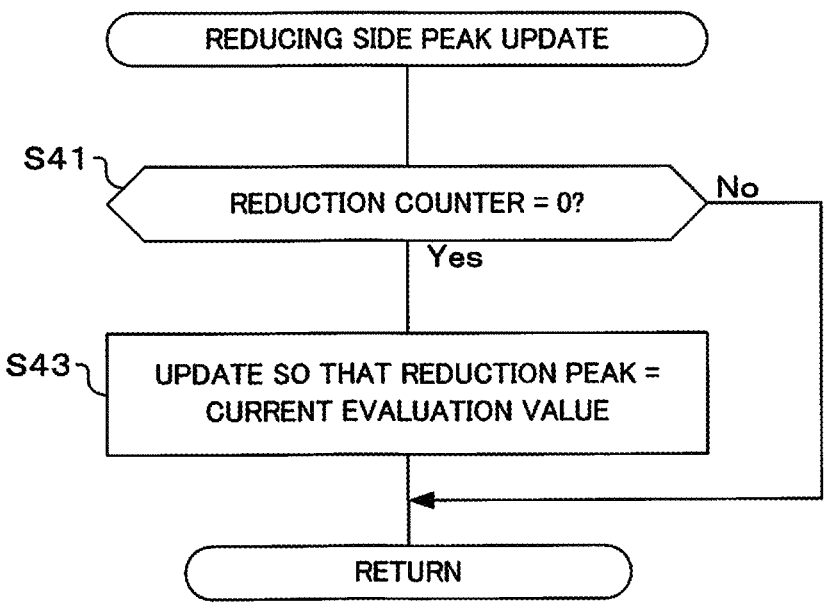
FIG. 11 is a flowchart showing operation of reducing side peak update in the cell observation device of one embodiment of the present invention.

Next, update operation for the reducing side peak in step S25 (refer to FIG. 10) will be described using the flowchart shown in FIG. 11. If the flow for reducing side peak update is entered, it is first determined whether or not the reduction counter is 0 (S41). This flow for reducing side peak update is executed in a case where the focus evaluation value has an increasing tendency (refer, for example, to frame No. 1 to frame No. 4, and frame No. 7 to frame No. 9 in FIG. 8). Specifically, the reduction counter is at 0 until the focus evaluation value exceeds a reducing side peak. Then, if the focus evaluation value exceeds the reducing side peak (refer, for example, to frame 4 in FIG. 8) the reduction counter is counted up (refer to S65 and S67 in FIG. 14, which will be described later). Accordingly, in a case where the reduction counter is 0, it means that the reducing side peak has not yet been reached.

If the result of determination in step S41 is that the reduction counter is 0, update is performed such that reducing peak=current evaluation value (S43). As was described previously, since the result of determination in step S41 was that the focus evaluation value has an increasing tendency, in this step the value for reducing peak is replaced with the current evaluation value.

If update of current evaluation value has been performed in step S43, or if the result of determination in step S41 was that the reduction counter was not 0, the flow for reducing side peak update is terminated and the originating flow is returned to.

Figure 12:
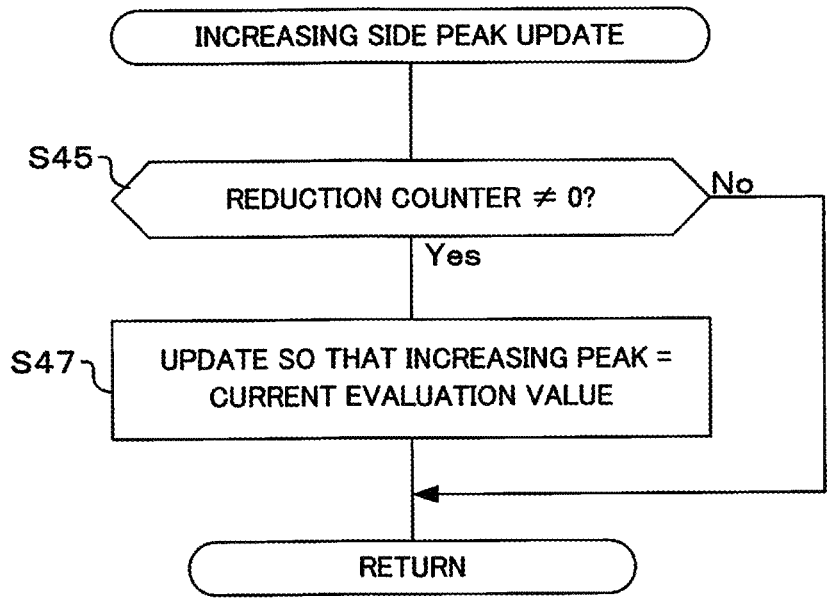
FIG. 12 is a flowchart showing operation of increasing side peak update in the cell observation device of one embodiment of the present invention.

Next, detailed operation of the increasing side peak in step S27 (refer to FIG. 10) will be described using the flowchart shown in FIG. 12. If the flow for increasing side peak update is entered, it is first determined whether or not the reduction counter is not 0 (S45). The flow for this increasing side peak update is the same as the case of the flow in FIG. 11, and is executed in the event that the focus evaluation value has an increasing tendency (refer, for example, to Frame Nos. 1 to 4 and 7 to 9 in FIG. 8). Also, if the focus evaluation value passes a reducing side peak and the focus evaluation value constitutes a minimum, the reduction counter commences counting up. Accordingly, when detecting an increasing side peak, detection is performed in a range where the reduction counter is not 0.

If the result of determination in step S45 is that the reduction counter is not 0, update is performed such that increasing peak=current evaluation value (S47). As was described previously, since the result of determination in step S45 was that the focus evaluation value has an increasing tendency, in this step the increasing peak is replaced with the current evaluation value.

If update of current evaluation value has been performed in step S47, or if the result of determination in step S45 was that the reduction counter was 0, the flow for increasing side peak update is terminated and the originating flow is returned to.

Figure 13:
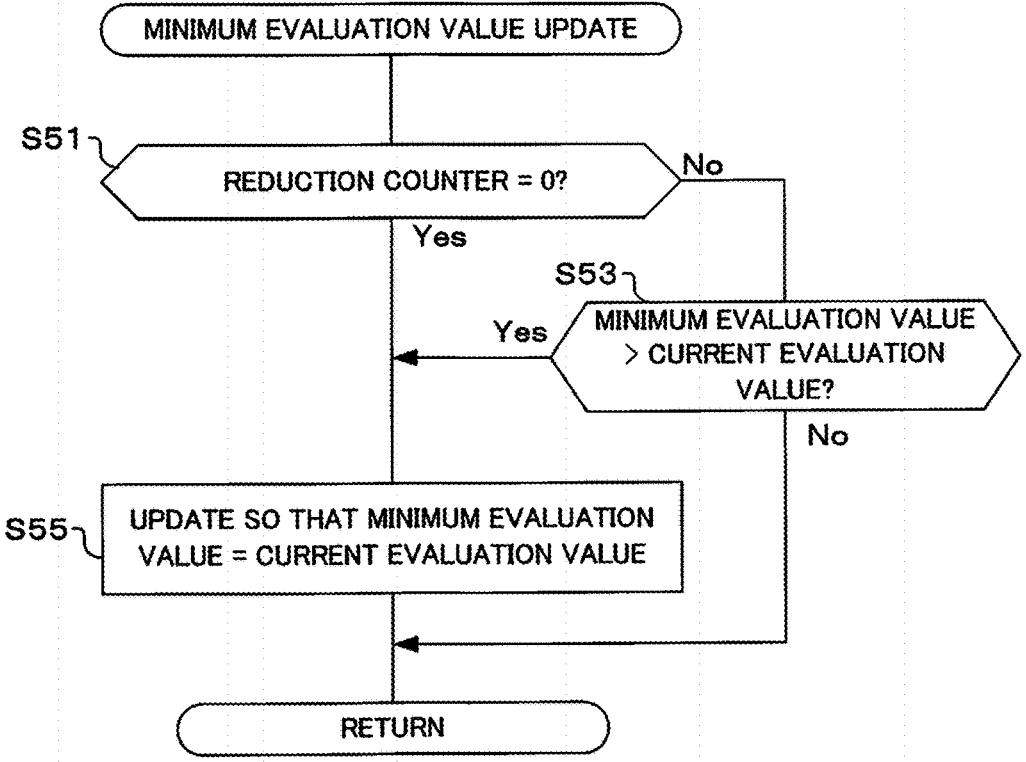
FIG. 13 is a flowchart showing operation of minimum evaluation value update in the cell observation device of one embodiment of the present invention.

Next, detailed operation of the minimum evaluation value update in step S23 (refer to FIG. 10) will be described using the flowchart shown in FIG. 13. If the flow for minimum evaluation value update is entered, it is first determined whether or not the reduction counter is 0 (S51). This flow for minimum evaluation value update is executed in a case where the focus evaluation value has a reducing tendency (refer, for example, to frame No. 5 to frame No. 6, and frame No. 10 to frame No. 11 in FIG. 8). Also, in the event that the reduction counter is 0, it is a case where the reducing side peak is passed and the focus evaluation value does not reach a minimum. On the other hand, even if the reduction counter is not 0, there may be cases where the focus evaluation value has a reducing tendency after the increasing side peak is passed.

If the result of determination in step S51 is that the reduction counter is not 0, it is determined whether or not minimum evaluation value>current evaluation value (S53). Since the reduction counter is not 0, then after the reducing side peak or the increasing side peak are passed, if the focus evaluation value has a reducing tendency minimum value update is performed. In this step, it is determined whether or not the current evaluation value is smaller than minimum evaluation value.

If the result of determination in step S51 is that the reduction counter is 0, or if the result of determination in step S53 is that the minimum evaluation value is larger than the current evaluation value, Update is performed such that minimum evaluation value=current evaluation value (S55). In this case, then since it is a case where the focus evaluation value is exceeding the reducing side peak, or where the focus evaluation value is exceeding the increasing side peak, the minimum evaluation value is replaced with the current evaluation value.

If update of minimum evaluation value has been performed in step S55, or if the result of determination in step S53 was that the minimum evaluation value is not larger than the current evaluation value, the flow for minimum evaluation value update is terminated and the originating flow is returned to.

Figure 14:
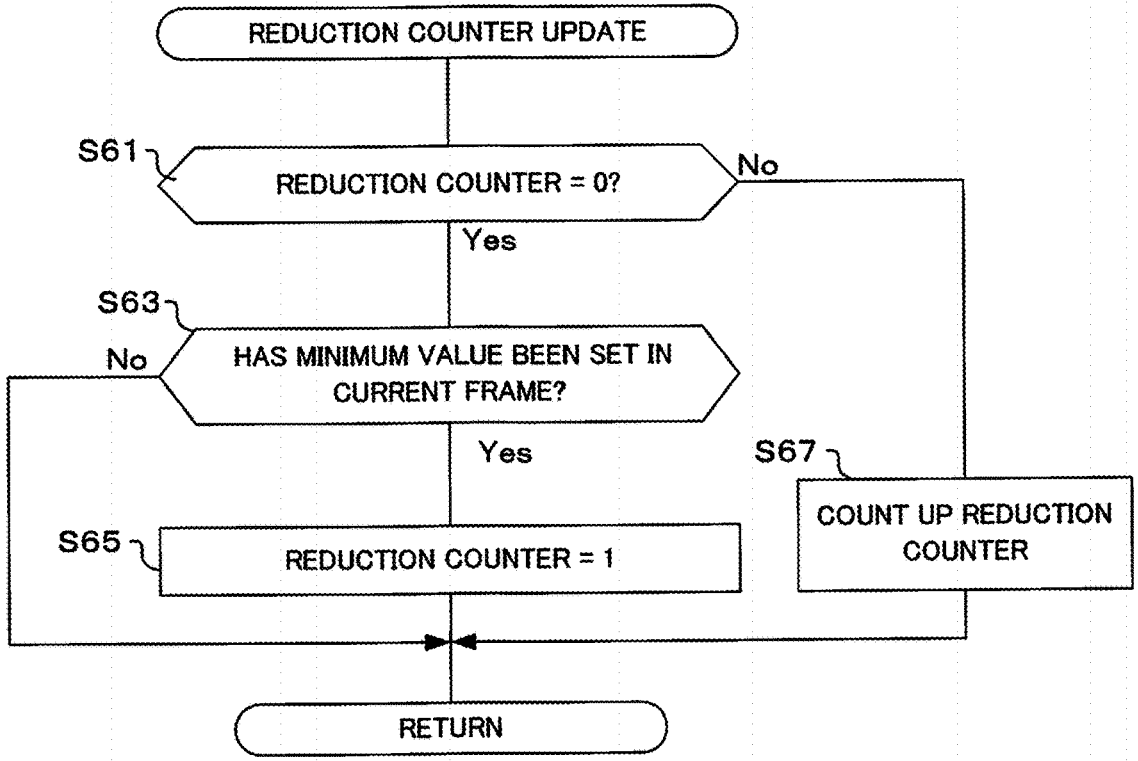
FIG. 14 is a flowchart showing operation of reduction counter update in the cell observation device of one embodiment of the present invention.

Next, detailed operation of the reduction counter update in step S29 (refer to FIG. 10) will be described using the flowchart shown in FIG. 14. If the flow for reduction counter update is entered, it is first determined whether or not the reduction counter is 0 (S61). The reduction counter has a default value of 0, and is counted up in steps S65 and S66, which will be described later.

If the result of determination step S61 is that the reduction counter is 0, it is next determined whether or not a minimum value (minimum evaluation value) has been set in the current frame (S63). In this step, it is determined whether or not step S55 (FIG. 13) has been executed for the current frame. If step S55 (FIG. 13) was executed, YES is determined in step S63, while if step S55 was not executed the determination is NO.

If the result of determination in step S63 is that a minimum value has not been set for the current frame, the reduction counter is set to 1 (S65). For example, the reduction counter is set to 1 in the next frame in which the reducing side peak (for example, corresponding to position of frame No. 4 in FIG. 8 and frame No. 3 in FIG. 9) has been exceeded, as shown in frame No. 6 in FIG. 8, and frame No. 4 in FIG. 9, for example.

On the other hand, if the result of determination in step S61 is that the reduction counter is not 0, counting up of the reduction counter is performed (S67). If the focus evaluation value exceeds the reducing side peak and constitutes a minimum value, the reduction counter is set to 1 in step S65, and after that the determination of step S61 becomes No. Subsequently, the reduction counter is counted up unless the reduction counter is 0. For example, in frame Nos. 5 to 11 in FIG. 8 and frame Nos. 4 to 10 in FIG. 9, every time the frame No is increased by 1, the reduction counter is also counted up.

If the reduction counter has been set to 1 in step S65, or if counting up of the reduction counter has been performed in step S67, or if the result of determination in step S63 is that a minimum value has not been set with the current frame, the flow for reduction counter update is terminated and the originating flow is returned to.

Figure 15:
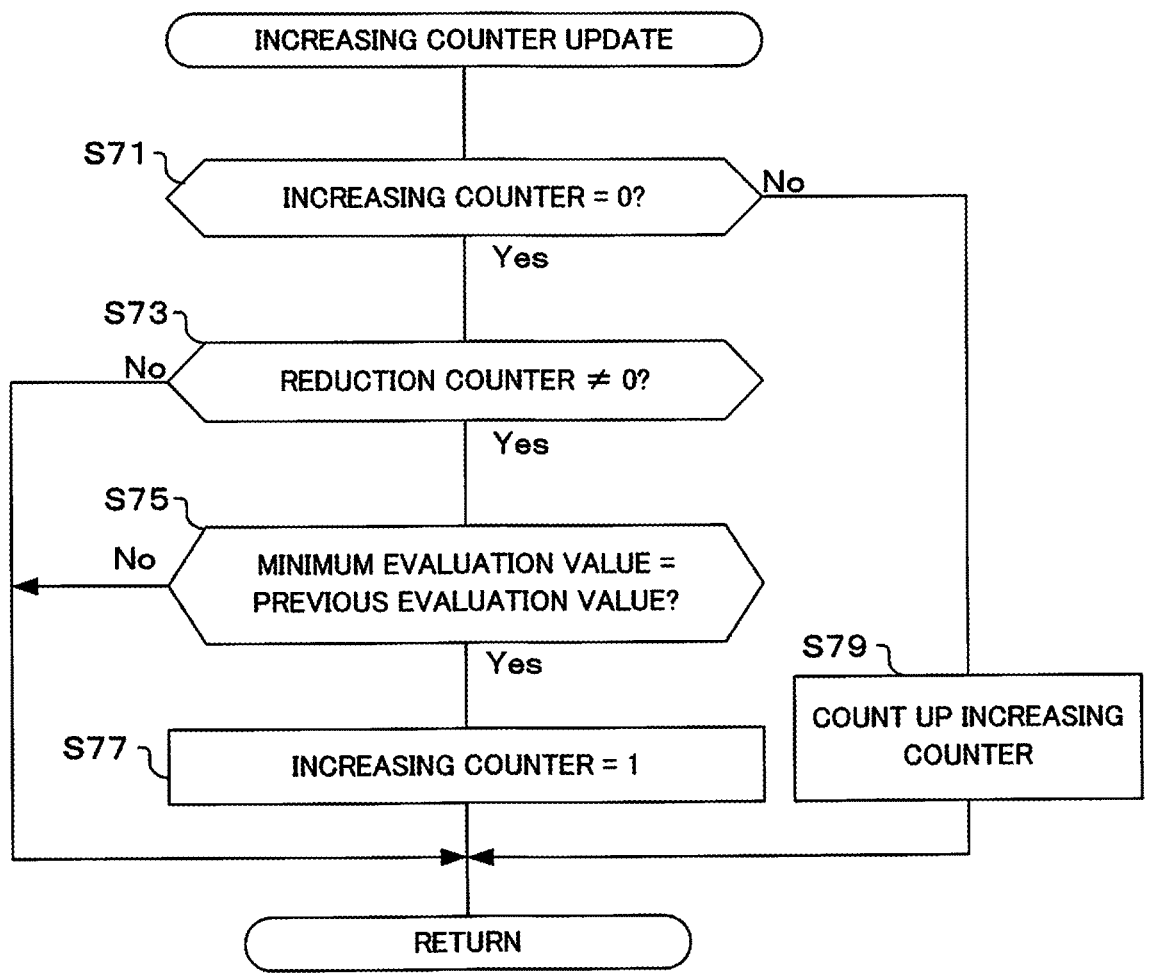
FIG. 15 is a flowchart showing operation of increasing counter update in the cell observation device of one embodiment of the present invention.

Next, detailed operation of the increasing counter update in step S31 (refer to FIG. 10) will be described using the flowchart shown in FIG. 15. If the flow for increasing counter update is entered, it is first determined whether or not the increasing counter is 0 (S71). If the increasing counter exceeds the reducing side peak and further the position of the focus evaluation value minimum is passed, counting up is commenced.

If the result of determination in step S71 is that the increasing counter is 0, it is next determined whether or not the reduction counter is not 0 (S73). As was described previously, if the focus evaluation value exceeds a reducing side peak counting up of the reduction counter is commenced. In this step determination is based on the count of the reduction counter.

If the result of determination in step S73 is that the reduction counter is not 0, it is determined whether or not minimum evaluation value and the previous evaluation value are the same (S75). Since the reduction counter is not 0, it is a case where the reducing side peak has been exceeded. In this step, determination is based on a comparison result of the minimum evaluation value that was saved in step S55 (FIG. 13) and the focus evaluation value that was obtained in the previous frame that was saved in step S37 (FIG. 10) (previous evaluation value).

If the result of determination in step S75 is that the minimum evaluation value is the same as the previous evaluation value, next the increasing counter is set to 1 (S77). From the determinations in steps S71, S73 and S75, since the reducing side peak has been reached and a local minimum position has been reached, in this step the increasing counter is set to 1. For example, the increasing counter is set to 1 in the next frame in which a local minimum (for example, corresponding to position of frame No. 6 in FIG. 8 and frame No. 4 in FIG. 9), after the reducing side peak has been exceeded, has been exceeded, as shown in frame No. 7 in FIG. 8, and frame No. 5 in FIG. 9.

On the other hand, if the result of determination in step S71 is that the increasing counter is not 0, counting up of the increasing counter is performed (S79). As was described previously, if the focus evaluation value exceeds a minimum after the reducing side peak has been exceeded, in step S77, the increasing counter is set to 1. After this, the determination result in step S71 becomes No. Subsequently, the increasing counter is counted up unless the increasing counter is 0. For example, in frame Nos. 7 to 11 in FIG. 8 and frame Nos. 5 to 10 in FIG. 9, every time the frame No is increased by 1, the increasing counter is also counted up.

If the increasing counter has been set to 1 in step S77, or if counting up of the increasing counter has been performed in step S79, or if the result of determination in step S73 is that the reduction counter is 0, or if the result of determination in step S75 is not that minimum evaluation value=previous evaluation value, the flow for increasing counter update is terminated and the originating flow is returned to.

Next, detailed operation of the local minimum determination in step S35 (refer to FIG. 10) will be described using the flowchart shown in FIG. 16. If the flow for local minimum determination is entered, a maximum rate of reduction rate (X) is calculated (S81). Maximum reduction rate is calculated using the following equation.

Maximum reduction rate $(X)$=(reducing side peak−minimum evaluation value)/reducing side peak For example, with the example shown in FIG. 8, the maximum reduction rate is calculated using $X=(D-F)/D$. Also, with the example shown in FIG. 9, maximum reduction rate at the initial peak is calculated using $X=(C-D)/C$, and maximum reduction rate at the next peak is calculated using $X=(I-K)/I$.

If maximum reduction rate (X) has been calculated, it is next determined whether or not $X \geq$ either of the rate of change threshold values Th1 to Th3 (S83). Here, it is determined whether or not the maximum reduction rate that was calculated in step S81 is greater than or equal to at least one of the three reduction rate threshold values Th1 to Th3. For example, with the example shown in FIG. 8, the maximum reduction rate (X) for the reducing side peak is $X=(D-F)/D$, and is larger than threshold value Th1.

If the result of determination in step S83 is that the maximum reduction rate (X) is larger than any of the rate of change threshold values Th1 to Th3, next an increase rate threshold value is determined (S85). Here, an increase rate threshold value is determined based on a threshold value that satisfied the conditions of X or greater at the time of the determination of step S83. In the description of FIG. 8, the increase rate threshold value is determined to be Th2 or Th3.

Next, it is determined whether or not a reduction counter value at time point $X \leq$ a reduction counter defined value (distance defined value) (S87). Time point X is a point in time where the reduction rate of the focus evaluation value has become maximum, and it is determined whether or not a reduction counter value at this point in time is the distance defined value or less. The distance-defined value is equivalent to a movement amount (movement distance) of the focus lens, and is set as appropriate. With the examples shown in FIG. 8 and FIG. 9, 4 is set as the distance defined value. In a case where a reduction counter value for time point X is larger than a reduction counter defined value (distance defined value), then since the range for performing detection of a local minimum has already been exceeded, the minimum value of focus evaluation value is not treated as a local minimum (refer to S97 which will be described later).

If the result of determination in step S87 is that the reduction counter value for time point X≤the reduction counter defined value (distance defined value), a maximum increase rate (Y) is calculated (S89). Maximum increase rate is calculated using the following equation.

$$\text{Maximum increase rate }(Y)=(\text{increasing side peak}-\text{minimum evaluation value})/\text{minimum evaluation value}$$

For example, with the example shown in FIG. 8, the maximum increase rate is calculated using Y=(I−F)/F. Also, the initial increasing side peak in the example shown in FIG. 9 is calculated using Y=(I−D)/D.

Once maximum increase rate (Y) has been calculated, it is next determined whether or not Y≥increase rate threshold value (S91). Here, maximum increase rate (X) that was calculated in step S89 is determined using the threshold value that was determined in step S85, among the plurality of reduction rate threshold values Th1 to Th3. In FIG. 8, the increase rate threshold value is determined to be Th2 or Th3.

If the result of determination in step S91 is that increase rate≥increase rate threshold value, it is next determined whether or not increasing counter value at time point Y≤increasing counter defined value (distance defined value) (S93). Time point Y is a point in time where the increase rate for focus evaluation value has become a maximum, and it is determined whether or not the increasing counter value at this point in time is less than or equal to the increasing counter defined value (distance defined value). The distance-defined value is equivalent to a movement amount (movement distance) of the focus lens, and is set as appropriate. With the examples shown in FIG. 8 and FIG. 9, 4 is set as the distance defined value. In a case where an increase counter value for time point Y is larger than an increase counter defined value (distance defined value), then since the range for performing detection of a local minimum has already been exceeded, the minimum value of focus evaluation value is not treated as a local minimum (refer to S97 which will be described later).

If the result of determination in step S93 is that the increasing counter value at time point Y increasing counter defined value (distance defined value), the minimum value is made a local minimum (S95). In this case, since the increasing counter at the point in time where the increase rate became a maximum is less than or equal to the increasing counter defined value (distance defined value), the minimum value of focus evaluation value is made a local minimum.

On the other hand, if the result of determination in steps S83, S87, S91, and S93 is No, the minimum value of focus evaluation value is set to not a local minimum.

If it has been determined to make the minimum value a local minimum or not a local minimum in steps S95 or S97, the flow for local minimum determination is terminated and the originating flow is returned to. It should be noted that reduction amount or increase amount may also be used instead of reduction rate and increase rate. That is, a reduction amount represents a difference between reducing side peak and a local minimum value, and an increase amount represents a difference between increasing side peak and a local minimum value. Since rate of change (reduction rate, increase rate) is not affected by the magnitude of focus evaluation value as much as it is affected by a difference between a peak and a local minimum value, more stable detection is possible.

Figure 16:
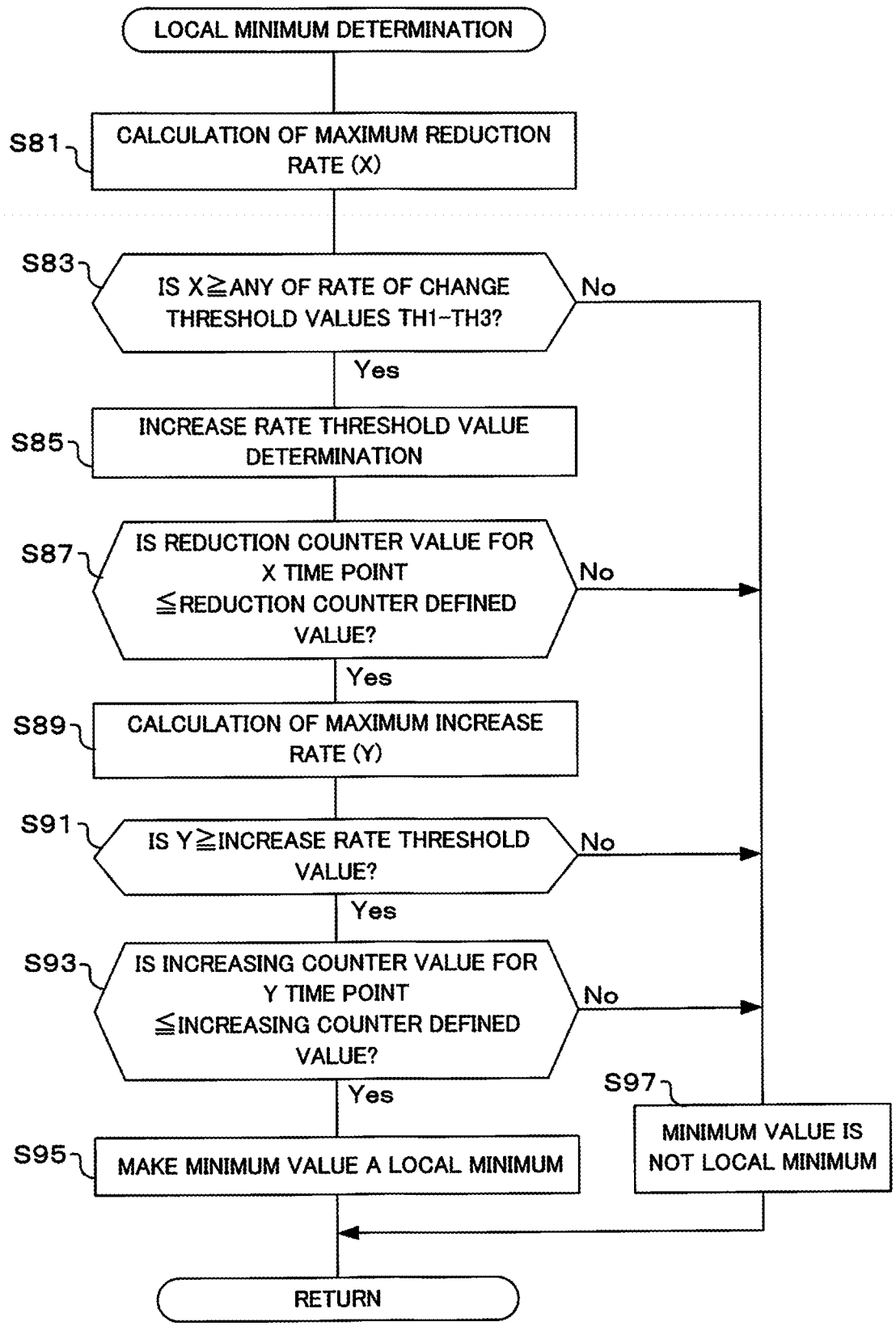
FIG. 16 is a flowchart showing operation of local minimum determination processing in the cell observation device of one embodiment of the present invention.

As has been described above, with the one embodiment of the present invention, a distance from a peak of focus evaluation value to a minimum, and a distance from a minimum to another peak (lens spacing), are respectively measured, and in the event that the respective distances are within distance defined values (with the examples shown in FIG. 8 and FIG. 9, that a reduction counter is 4 or more or that an increasing counter is 4 or more, refer to S87 and S93 in FIG. 16) and a change amount is as defined or greater (Th1 to Th3 in FIG. 8 and FIG. 9), then the position of that minimum is determined to be a local minimum position (refer to S95 in FIG. 16). This means that even in a case where a false local minimum appears due to impurity or the like, the false local minimum is not determined to be a local minimum, and so it is possible to detect a local minimum position of focus evaluation value and perform focus adjustment of a focus lens with high precision and at high speed.

Also, with the one embodiment of the present invention, determination uses maximum reduction amount from a peak to a minimum position, and maximum increase amount from a minimum position to another peak, as change amount (refer to Th1 to Th3 in FIG. 8 and FIG. 9).

Also, with the one embodiment of the present invention, a plurality of threshold values are set for change amount (Th1 to Th3), and another change amount threshold value is updated in accordance with a threshold value for which one change amount was satisfied (refer to S91 in FIG. 16).

Also, with the one embodiment of the present invention, an imaging is operation is executed by changing focus position of an imaging section and an image signal is output (refer, for example, to S5 in FIG. 7), an evaluation value that has a larger value as degree of focus increases is calculated based on the image signal (refer, for example, to S7 in FIG. 7), and a focus position where focus is achieved is detected based on the evaluation value (refer, for example, to S9 and S17 in FIG. 7). When peaks of evaluation value have been detected at different focus positions, minimums of evaluation value are detected between focus positions of a plurality of peaks (refer, for example, to position of frame 6 in FIG. 8 and S23 in FIG. 10), and, when a first difference between a first peak, among a plurality of peaks (for example, position of frame 4 in FIG. 8), and a focus position of a minimum, and a second difference between a minimum and a second peak among a plurality of peaks (for example, the position of frame 9 in FIG. 8), are within respective specified ranges (refer, for example to S87 and S93 in FIG. 16), this focus position where focus is achieved is detected based on the focus position of the minimum.

Also, with the one embodiment of the present invention, it is determined whether or not respective distances from a peak of focus evaluation value to a minimum, and from the minimum to another peak, are as defined or less, and whether or not change amount is as defined or larger, and a minimum position is determined to be a local minimum position. However, if it is allowable to lower accuracy slightly, determination may also use only one of the criteria.

Also, with the one embodiment of the present invention, whether or not change amount is as defined or greater is determined using both differences, namely a difference between reducing side peak and minimum evaluation value, and a difference between increasing side peak and a minimum evaluation value, but determination may also use only one of these differences.

Also, with the one embodiment of the present invention three threshold values have been set for change amount. However, this is not limiting and only one threshold value may be used, or two, or four or more threshold values may be used. Also, absolute values for threshold values at the reducing side and increasing side have used the same values, but it is also possible to use different values at the reducing side and increasing side depending on differences in characteristics of focus evaluation values.

Also, with each of the embodiments of the present invention, the shooting state estimation section 115, shooting setting section 117, focus reference position setting section 119, image processing section 109, AE processing section 111 and AF processing section 113 are constructed separately from the microcomputer 121, but some or all of these sections may be constituted by software, and executed by the microcomputer 121.

Also, with the one embodiment of the present invention, focus adjustment was performed by moving the optical system 1 using the lens control section 4. However, this is not limiting, and focus may also be adjusted by moving the image sensor 2 in the optical axis direction of the optical system 1 with the optical system 1 fixed, and focus may also be adjusted by moving a specimen, such as cells or a cell vessel, in the optical axis direction of the optical system 1. In this case, focus position of the focus lens is changed, and this also includes changing focus conditions by moving the image sensor and/or the specimen.

Also, with the one embodiment of the present invention, the image signal processing section 3, lens control section 4, imaging control section 5, AE processing section 6, image processing section 7, AF processing section 10, region setting section 11, extraction section 12, detection section 13, external connection section 14, LED control section 15 etc. are constructed separately from the CPU 9. However, this is not limiting and some or all of these sections may be constructed as software, and executed by the CPU 9. It is also possible for some or all of these sections, and functions of the CPU 9, to have a hardware structure such as gate circuits generated based on a programming language that is described using Verilog, and also to use a hardware structure that utilizes software such as a DSP (digital signal processor). Suitable combinations of these approaches may also be used.

Also, with the one embodiment of the present invention, description has been given using a cell observation device as a device for which focus adjustment is performed, but this is not limiting as long as there is a device for forming images of a subject such that a plurality of peaks arise in focus evaluation value, such as a camera, a medical camera, or a camera of a scientific instrument such as a microscope.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An observation device, comprising:
    an image sensor that images a specimen and outputs an image signal;
    an AF detection circuit that calculates an evaluation value showing a larger value as degree of focus increases, based on the image signal; and
    a controller that executes an imaging operation using the image sensor by changing focus position, executes calculation of the evaluation value using the AF detection circuit, and detects focus position where focus is achieved based on the evaluation value;
    wherein,
    the controller, when a plurality of peaks of the evaluation value have been detected for different focus positions, detects a minimum of the evaluation value between focus positions of the plurality of peaks, and in the event that a first difference between a first peak, among the plurality of peaks, and a focus position of the minimum, and a second difference between the minimum and a focus position of a second peak, among the plurality of peaks, are within respective specified ranges, detects a focus position where focus is achieved based on the focus position of the minimum.

2. The observation device of claim 1, wherein:
    the controller makes the specified ranges different in accordance with the first difference and the second difference.

3. The observation device of claim 1, wherein:
    when at least one of a third difference, between evaluation value of the first peak and evaluation value of the minimum, and a fourth difference, between evaluation value of the second peak and evaluation value of the minimum, exceeds a given value, the controller detects focus position where focus is achieved based on focus position of the minimum.

4. The observation device of claim 1, wherein:
the controller calculates at least one of a third difference, between evaluation value of the first peak and evaluation value of the minimum, and a fourth difference, between evaluation value of the second peak and evaluation value of the minimum, and in the event that the third difference or the fourth difference that have been calculated exceeds a given value, detects focus position where focus is achieved based on focus position of the minimum.

5. The observation device of claim 1, wherein:
the controller calculates at least one of a third difference, between evaluation value of the first peak and evaluation value of the minimum, and a fourth difference, between evaluation value of the second peak and evaluation value of the minimum,
the controller does not perform detection of focus position based on minimum focus position when at least one of the third difference and the fourth difference is smaller than a second given value.

6. The observation device of claim 1, wherein:
the controller calculates a third difference, between evaluation value of the first peak and evaluation value of the minimum, and a fourth difference, between evaluation value of the second peak and evaluation value of the minimum,
the controller detects focus position where focus is achieved based on the minimum focus position in the event that the third difference and the fourth difference exceed respectively different given values.

7. The observation device of claim 6, wherein:
the controller sets the different given value corresponding to the fourth difference in accordance with the third difference.

8. The observation device of claim 1, wherein:
the controller sets a range for detecting the second peak if an evaluation value of the first peak is detected, and further an evaluation value of the minimum is detected.

9. The observation device of claim 1, wherein:
the controller executes calculation of evaluation value using the AF detection circuit by changing focus position a specified amount at a time to execute an imaging operation using the image sensor, and detects focus position where focus is achieved by interpolation using evaluation values for focus positions before and after the minimum focus position.

10. A focus detection method for a focus detection device, comprising:
executing an imaging operation by changing focus position and outputting an image signal;
calculating an evaluation value showing a larger value as degree of focus increases, based on the image signal; and
detecting a focus position where focus is achieved based on the evaluation value;
wherein
when plurality of peaks of the evaluation value have been detected for different focus positions, detecting a minimum of the evaluation value between focus positions of the plurality of peaks, and in the event that a first difference between a first peak, among the plurality of peaks, and a focus position of the minimum, and a second difference between the minimum and a focus position of a second peak, among the plurality of peaks, are within respective specified ranges, detecting a focus position where focus is achieved based on the focus position of the minimum.

11. The focus detection method of claim 10, further comprising:
when at least one of a third difference, between evaluation value of the first peak and evaluation value of the minimum, and a fourth difference, between evaluation value of the second peak and evaluation value of the minimum, exceeds a given value, detecting focus position where focus is achieved based on focus position of the minimum.

12. The focus detection method of claim 10, further comprising:
making the specified ranges different in accordance with the first difference and the second difference.

13. The focus detection method of claim 10, further comprising:
calculating at least one of a third difference, between evaluation value of the first peak and evaluation value of the minimum, and a fourth difference, between evaluation value of the second peak and evaluation value of the minimum, and in the event that the third difference or the fourth difference that have been calculated exceed a given value, detecting focus position where focus is achieved based on focus position of the minimum.

14. The focus detection method of claim 10, further comprising:
calculating at least one of a third difference, between evaluation value of the first peak and evaluation value of the minimum, and a fourth difference, between evaluation value of the second peak and evaluation value of the minimum,
not performing detection of focus position based on minimum focus position when at least one of the third difference and the fourth difference is smaller than a second given value.

15. The focus detection method of claim 10, further comprising:
calculating a third difference, between evaluation value of the first peak and evaluation value of the minimum, and a fourth difference, between evaluation value of the second peak and evaluation value of the minimum,
detecting focus position where focus is achieved based on the minimum focus position in the event that the third difference and the fourth difference exceed respectively different given values.

16. The focus detection method of claim 15, wherein
the different given value corresponding to the fourth difference is set in accordance with the third difference.

17. The focus detection method of claim 10, further comprising:
setting a range for detecting the second peak if an evaluation value of the first peak is detected, and further an evaluation value of the minimum is detected.

18. The focus detection method of claim 10, further comprising:
calculating the evaluation value by changing focus position a specified amount at a time to execute an imaging operation using the image sensor, and detecting focus position where focus is achieved by interpolation using evaluation values for focus positions before and after the minimum focus position.

19. A non-transitory computer-readable medium storing a processor executable code, which, when executed by at least one processor, performs a focus detecting method, the focus detecting method comprising:

executing an imaging operation by changing focus position and outputting an image signal;

calculating an evaluation value showing a larger value as degree of focus increases, based on the image signal; and detecting a focus position where focus is achieved based on the evaluation value;

the focus detecting method further comprising:

when peaks of the evaluation value have been detected for different focus positions, detecting a minimum of the evaluation value between focus positions of the plurality of peaks, and in the event that a first difference between a first peak, among the plurality of peaks, and a focus position of the minimum, and a second difference between the minimum and a focus position of a second peak, among the plurality of peaks, are within respective specified ranges, detecting a focus position where focus is achieved based on the focus position of the minimum.

20. The non-transitory computer-readable medium of claim 19, wherein the focus adjustment method further comprises:

when at least one of a third difference, between evaluation value of the first peak and evaluation value of the minimum, and a fourth difference, between evaluation value of the second peak and evaluation value of the minimum, exceeds a given value, detecting focus position where focus is achieved based on focus position of the minimum.

\* \* \* \* \*